US012707443B2

(12) United States Patent
Li et al.

(10) Patent No.: US 12,707,443 B2
(45) Date of Patent: Aug. 11, 2026

(54) METHOD FOR SCHEDULING FREQUENCY-DOMAIN RESOURCE IN OFDMA, STA, AP, AND COMMUNICATIONS SYSTEM

(71) Applicant: Honor Device Co., Ltd., Shenzhen (CN)

(72) Inventors: Zheng Li, Shenzhen (CN); Qiulun Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 688 days.

(21) Appl. No.: 18/248,662

(22) PCT Filed: Apr. 28, 2022

(86) PCT No.: PCT/CN2022/089927

§ 371 (c)(1),
(2) Date: Apr. 11, 2023

(87) PCT Pub. No.: WO2022/267690

PCT Pub. Date: Dec. 29, 2022

(65) Prior Publication Data

US 2023/0397178 A1 Dec. 7, 2023

(30) Foreign Application Priority Data

Jun. 25, 2021 (CN) ........................ 202110713028.X

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0007* (2013.01); *H04L 5/0062* (2013.01); *H04W 72/21* (2023.01); *H04W 72/541* (2023.01)

(58) Field of Classification Search
CPC ............. H04W 72/0453; H04W 72/21; H04W 72/541; H04W 84/12; H04W 72/542;
(Continued)

(56) References Cited

U.S. PATENT DOCUMENTS 8,958,371 B2 2/2015 Gaal et al.
11,147,077 B2 10/2021 Yang et al.
(Continued)

FOREIGN PATENT DOCUMENTS

CN 107567108 A 1/2018
CN 109600209 A 4/2019
(Continued)

OTHER PUBLICATIONS

Huawei, "Necessary information for estimating UE throughput in WLAN", 3GPP TSG-RAN3 Meeting #85, R3-141583, Dresden Germany, Aug. 18-22, 2014, 5 pages.

*Primary Examiner* — Brian T O Connor
(74) *Attorney, Agent, or Firm* — Conley Rose, P.C.

(57) ABSTRACT

A method for scheduling a frequency-domain resource in OFDMA. In a Wi-Fi 6 OFDMA mode, because a bandwidth allocated to a user may be interfered with, the following is proposed: a STA device reports STA-side frequency-domain interference information to an AP device, where the frequency-domain interference information indicates a STA-side frequency-domain interference subband, so that the AP device avoids, based on the STA-side frequency-domain interference information, the frequency-domain interference subband when allocating an uplink frequency-domain resource to the STA device, selects a proper RU resource, and allocates the proper RU resource to the STA device for data transmission. In this way, the AP device cooperates and interacts with the STA device to schedule a frequency-domain resource in OFDMA, which may reduce impact of frequency-domain interference on Wi-Fi transmission, and
(Continued)

improve throughput in data transmission on a large OFDMA bandwidth.

20 Claims, 10 Drawing Sheets

(51) Int. Cl.
*H04W 72/21* (2023.01)
*H04W 72/541* (2023.01)

(58) Field of Classification Search
CPC ... H04W 28/065; H04W 72/04; H04W 72/02; H04L 5/0007; H04L 5/0062; H04L 5/0094; H04L 5/0044; H04L 69/22; H04L 69/323; H04L 5/0048; H04L 1/0618; H04L 5/001; H04L 5/0053; Y02D 30/70
See application file for complete search history.

(56) References Cited

U.S. PATENT DOCUMENTS 12,113,618 B2* 10/2024 Park ...................... H04L 1/0059
12,133,272 B2* 10/2024 Chu .................. H04W 72/0446
2016/0080108 A1 3/2016 Ben Ami et al.
2016/0119927 A1 4/2016 Hedayat
2018/0084548 A1 3/2018 Min et al.
2020/0137763 A1 4/2020 Yang et al.
2021/0067976 A1* 3/2021 Cariou .................. H04W 84/12
2021/0136803 A1 5/2021 Han et al.
2021/0153031 A1 5/2021 Sugaya et al.
2021/0410163 A1* 12/2021 Xia ..................... H04W 72/121
2022/0132371 A1* 4/2022 Wu ..................... H04W 28/065
2022/0311543 A1* 9/2022 Park ...................... H04L 1/0075
2023/0035273 A1 2/2023 Choi et al.
2024/0291912 A1* 8/2024 Chun ................ H04W 72/0453

FOREIGN PATENT DOCUMENTS

CN 109756978 A 5/2019
CN 110475282 A 11/2019
CN 110719642 A 1/2020
CN 112584405 A 3/2021
CN 113473622 A 10/2021
EP 4132087 A1 2/2023
WO 2010030938 A1 3/2010
WO 2017043912 A1 3/2017
WO 2019033424 A1 2/2019

* cited by examiner

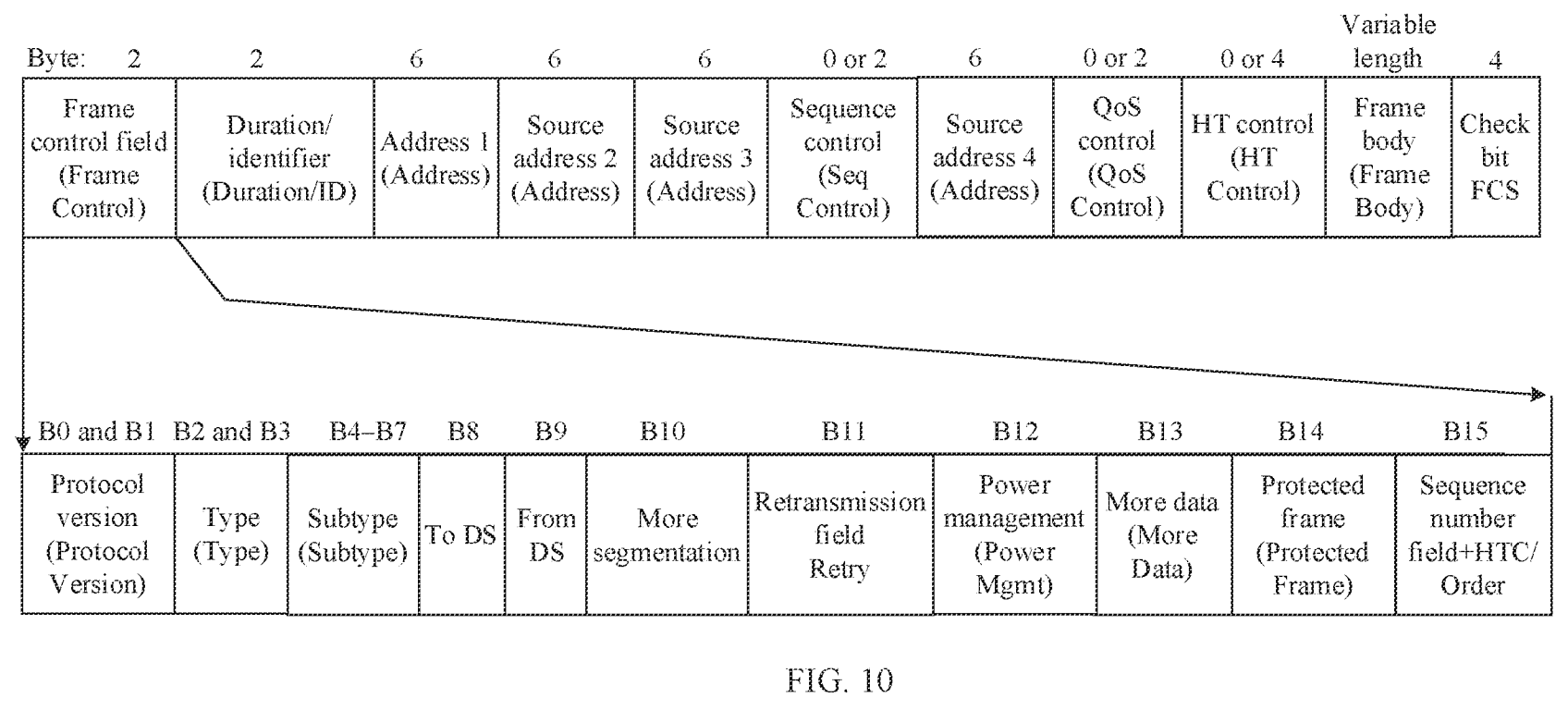

| Byte: | 2 | 2 | 6 | 6 | 6 | 0 or 2 | 6 | 0 or 2 | 0 or 4 | Variable length | 4 |
|---|---|---|---|---|---|---|---|---|---|---|---|
| | Frame control field (Frame Control) | Duration/ identifier (Duration/ID) | Address 1 (Address) | Source address 2 (Address) | Source address 3 (Address) | Sequence control (Seq Control) | Source address 4 (Address) | QoS control (QoS Control) | HT control (HT Control) | Frame body (Frame Body) | Check bit FCS |

| B0 and B1 | B2 and B3 | B4–B7 | B8 | B9 | B10 | B11 | B12 | B13 | B14 | B15 |
|---|---|---|---|---|---|---|---|---|---|---|
| Protocol version (Protocol Version) | Type (Type) | Subtype (Subtype) | To DS | From DS | More segmentation | Retransmission field Retry | Power management (Power Mgmt) | More data (More Data) | Protected frame (Protected Frame) | Sequence number field+HTC/ Order |

FIG. 10

METHOD FOR SCHEDULING FREQUENCY-DOMAIN RESOURCE IN OFDMA, STA, AP, AND COMMUNICATIONS SYSTEM

CROSS-REFERENCE TO RELATED APPLICATIONS

This application is a U.S. National Stage of International Application No. PCT/CN2022/089927 filed on Apr. 28, 2022, which claims priority to Chinese Patent Application No. 202110713028.X, filed with the China National Intellectual Property Administration on Jun. 25, 2021 both of which are incorporated herein by reference in their entireties.

TECHNICAL FIELD

This application relates to the field of communications technologies, and in particular, to a method for scheduling a frequency-domain resource in OFDMA, a station STA, an access point AP, and a communications system.

BACKGROUND

With an increasing prevalence of service applications such as video conferencing, wireless interaction VR, and mobile teaching, increasingly more terminal devices access a Wi-Fi network. The development of the Internet of things (Internet of things, IoT) allows increasingly more smart home devices to access the Wi-Fi network.

In an orthogonal frequency division multiple access (orthogonal frequency division multiple access, OFDMA) mode in a Wi-Fi 6 standard, resources of an entire channel are divided into a plurality of time-frequency resource blocks with a fixed size, and each time-frequency resource block is a resource unit (resource unit, RU). Data of different users may be carried on different RUs, and as seen from the entire time-frequency resource, a plurality of users may simultaneously transmit data in each time segment.

However, when a plurality of users simultaneously access the Wi-Fi network to transmit data through an air interface, an unlicensed (unlicensed) spectrum used by Wi-Fi may be interfered with by various interference, and a bandwidth allocated to each user may be interfered with, which affects Wi-Fi throughput, causing worse user experience.

SUMMARY

This application provides a method for scheduling a frequency-domain resource in OFDMA, a station STA, an access point AP, and a communications system, to resolve a problem that uplink frequency band interference occurs when a plurality of users simultaneously transmit data in an OFDMA mode in a Wi-Fi 6 standard.

To achieve the foregoing objective, the following technical solutions are used in this application.

According to a first aspect, this application provides a communications system for scheduling a frequency-domain resource in OFDMA. The communications system includes a first access point AP and a plurality of stations STAs that support a wireless network Wi-Fi 6 communications protocol, and the plurality of stations STAs access the first AP in an OFDMA manner.

A first STA is configured to report first frequency-domain interference information to the first AP, where the first frequency-domain interference information is used to indicate that a first frequency-domain subband is an interference subband, and the first STA is one of the plurality of STAs.

The first AP is configured to: receive the first frequency-domain interference information sent by the first STA, and schedule an uplink frequency-domain resource of the first STA based on the first frequency-domain interference information, so that an uplink frequency-domain resource allocated to the first STA does not include the first frequency-domain subband.

In a Wi-Fi 6 OFDMA mode, because a bandwidth allocated to a user may be interfered with, the following solution is proposed in this application: In the communications system provided in this application, a STA device reports STA-side frequency-domain interference information to an AP device, where the frequency-domain interference information indicates a STA-side frequency-domain interference subband, so that the AP device avoids, based on the STA-side frequency-domain interference information, the frequency-domain interference subband when allocating an uplink frequency-domain resource to the STA device, selects a proper RU resource, and allocates the proper RU resource to the STA device for data transmission. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation of the first aspect, the first STA is specifically configured to send a first media access control MAC packet to the first AP, where a payload of the first MAC packet carries the first frequency-domain interference information, and a reserved field in a frame control field of the MAC packet indicates that the first MAC packet carries the first frequency-domain interference information. The first AP is specifically configured to: receive the first MAC packet sent by the first STA, and schedule the uplink frequency-domain resource of the first STA based on the first frequency-domain interference information carried in the first MAC packet.

In the solution of this application, the STA device adds the frequency-domain interference information to a frame body of the MAC packet, defines, in the reserved field of the MAC packet, functions of a management frame and a control frame, that is, transmitting frequency band interference information, and reports the frequency band interference information to the AP side, which effectively ensures that the STA device and the AP device cooperate in exchange of the frequency band interference information, thereby improving reliability of data transmission.

In a possible implementation of the first aspect, the frame control field of the first MAC packet includes a frame type value and a frame subtype value, and the reserved field is a private field indicated by the frame subtype value. When the frame type value indicates that the first MAC packet is a management frame or a control frame, the reserved field indicates that the first MAC packet carries the first frequency-domain interference information.

In the solution of this application, the reserved field of the MAC packet is used to define the functions of the management frame and the control frame, that is, transmitting the frequency band interference information, which may effectively ensure that the STA device and the AP device cooperate in exchange of the frequency band interference information, thereby improving reliability of data transmission.

In a possible implementation of the first aspect, the first STA is further configured to report, to the first AP, first channel granularity information corresponding to the first STA, where the first channel granularity information is used to indicate that the first STA uses a first resource unit RU channel granularity, and the RU represents one or more tones in frequency domain.

The first AP is further configured to: receive the first channel granularity information, and allocate an uplink frequency-domain resource to the first STA based on the first RU channel granularity.

In the solution of this application, the AP device may select a proper RU resource based on channel granularity information reported by the STA device, and allocate the proper RU resource to the STA device for data transmission, to improve throughput in data transmission on a large OFDMA bandwidth.

In a possible implementation of the first aspect, the first RU channel granularity includes a 26-tone RU, a 52-tone RU, a 106-tone RU, a 242-tone RU, a 484-tone RU, a 996-tone RU, or a 2×996-tone RU, or any combination of the channel granularities.

In the solution of this application, an RU channel granularity may have a plurality of possibilities, so that an RU resource allocated by the AP device to the STA device may be more refined, to improve throughput in data transmission on a large OFDMA bandwidth.

In a possible implementation of the first aspect, the first STA is further configured to add the first channel granularity information corresponding to the first STA to an RU allocation subfield in the frame control field of the packet sent to the first AP.

In a possible implementation of the first aspect, the first STA is specifically configured to periodically report the first frequency-domain interference information to the first AP.

In a possible implementation of the first aspect, the first AP is further configured to send a first query request to the first STA, where the first query request is used to request the first STA to report the first frequency-domain interference information. The first STA is specifically configured to: receive the first query request, perform frequency domain measurement in response to the first query request to obtain the first frequency-domain interference information, and report the first frequency-domain interference information to the first AP.

In the foregoing solution, the STA device may periodically report the frequency-domain interference information to the AP device, or may report the frequency-domain interference information in response to a request of the AP. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation of the first aspect, the first AP is further configured to send a first response message to the first STA when receiving the first frequency-domain interference information reported by the first STA, where the first response message is used to indicate that the first AP receives the first frequency-domain interference information reported by the first STA. The first STA is further configured to receive the first response message sent by the first AP.

In the foregoing solution, the STA device receives a reporting response after reporting the frequency-domain interference information to the AP device. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation of the first aspect, the first STA is further configured to send a first registration request to the first AP, where the first registration request is used to apply to the first AP for registration of a frequency-domain interference information reporting feature. The first AP is further configured to: receive the first registration request, and send a second response message to the first STA in response to the first registration request, where the second response message is used to indicate that registration application succeeds or registration application fails. When registration application succeeds, the first AP supports in receiving the first frequency-domain interference information sent by the first STA, and schedules a frequency-domain resource of the first STA based on the first frequency-domain interference information.

In the foregoing solution, the STA device and the AP device negotiate on a capability, and after registration application succeeds, the AP device and the STA dev ice complete negotiation on the frequency-domain interference information reporting feature. In this way, frequency-domain interference information reporting can be further supported.

In a possible implementation of the first aspect, the first AP is further configured to advertise a first feature message, where the first feature message is used to indicate that the first AP supports or does not support the frequency-domain interference information reporting feature. The first STA is specifically configured to send the first registration request to the first AP when receiving the first feature message advertised by the first AP and the first feature message indicates that the first AP supports the frequency-domain interference information reporting feature.

In the foregoing solution, the AP device advertises whether the AP side supports the frequency-domain interference information reporting feature, so that the STA device determines, based on a situation, whether it is necessary to apply to the AP device for registration of the frequency-domain interference information reporting feature, to improve efficiency of capability negotiation.

In a possible implementation of the first aspect, the first STA is specifically configured to send the first registration request to the first AP when completing a scanning and discovery procedure, an authentication procedure, and an association procedure with the first AP.

In the foregoing solution, after accessing the AP device, the STA device may apply to the AP device for registration of the frequency-domain interference information reporting feature, to improve communication security.

In a possible implementation of the first aspect, the first STA is specifically configured to send a first probe request message to the first AP, where the first probe request message includes a physical MAC address of the first STA. The first AP is further configured to: obtain the MAC address of the first STA from the received first probe request message, and send a first probe response message to the first STA based on the MAC address of the first STA, where the first probe response message is used to indicate that the first STA is scanned and discovered by the first AP.

In the foregoing solution, the STA device actively sends an identifier of the STA device, which helps the AP device scan and discover the STA device, to improve efficiency of communication between the two ends.

In a possible implementation of the first aspect, the first STA is further configured to report a reporting type of the frequency-domain interference information to the first AP, where the reporting type is periodic reporting or aperiodic reporting; and/or the first STA is further configured to report a quantity of valid reported bits of the frequency-domain interference information to the first AP.

In the foregoing solution, in addition to reporting the frequency-domain interference information and the channel granularity information, the STA device further reports the reporting type and the quantity of valid reported bits to the AP device, so that accuracy and reliability of obtaining the frequency-domain interference information by the AP device can be improved.

According to a second aspect, this application provides a method for scheduling a frequency-domain resource in OFDMA, applied to a first station STA. The first STA supports a wireless network Wi-Fi 6 communications protocol, and the first STA accesses a first access point AP in an OFDMA manner. The method includes: The first STA reports first frequency-domain interference information to the first AP, where the first frequency-domain interference information is used to indicate that a first frequency-domain subband is an interference subband. The first frequency-domain interference information is used by the first AP to schedule an uplink frequency-domain resource of the first STA, so that an uplink frequency-domain resource allocated to the first STA does not include the first frequency-domain subband.

In a Wi-Fi 6 OFDMA mode, because a bandwidth allocated to a user may be interfered with, a STA-side solution is proposed in this application: In the method for scheduling a frequency-domain resource in OFDMA provided in this application, a STA device reports STA-side frequency-domain interference information to an AP device, where the frequency-domain interference information indicates a STA-side frequency-domain interference subband, so that the AP device can avoid, based on the STA-side frequency-domain interference information, the frequency-domain interference subband when allocating an uplink frequency-domain resource to the STA device, select a proper RU resource, and allocate the proper RU resource to the STA device for data transmission. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation of the second aspect, that the first STA reports first frequency-domain interference information to the first AP includes: The first STA sends a first media access control MAC packet to the first AP, where a payload of the first MAC packet carries the first frequency-domain interference information, and a reserved field in a frame control field of the first MAC packet indicates that the first MAC packet carries the first frequency-domain interference information.

In a possible implementation of the second aspect, the frame control field of the first MAC packet includes a frame type value and a frame subtype value, the frame type value is used to indicate a management frame or a control frame, and the reserved field is a private field indicated by the frame subtype value. When a frame type is the management frame or the control frame, the reserved field indicates that the first MAC packet carries the first frequency-domain interference information.

In a possible implementation of the second aspect, the method further includes: The first STA reports, to the first AP, first channel granularity information corresponding to the first STA, where the first channel granularity information is added to an RU allocation subfield in the frame control field of the packet sent to the first AP. The first channel granularity information is used to indicate that the first STA uses a first resource unit RU channel granularity, and the RU represents one or more tones in frequency domain.

In a possible implementation of the second aspect, the first RU channel granularity includes a 26-tone RU, a 52-tone RU, a 106-tone RU, a 242-tone RU, a 484-tone RU, a 996-tone RU, or a 2×996-tone RU, or any combination of the channel granularities.

In a possible implementation of the second aspect, the method further includes: The first STA periodically reports the first frequency-domain interference information to the first AP.

In a possible implementation of the second aspect, the method further includes: The first STA receives a first query request sent by the first AP where the first query request is used to request the first STA to report the first frequency-domain interference information. The first STA performs frequency domain measurement in response to the first query request to obtain the first frequency-domain interference information, and reports the first frequency-domain interference information to the first AP.

In a possible implementation of the second aspect, the method further includes: The first STA sends a first registration request to the first AP, where the first registration request is used to apply to the first AP for registration of a frequency-domain interference information reporting feature. When registration application succeeds, the first AP supports in receiving the first frequency-domain interference information sent by the first STA, and schedules a frequency-domain resource of the first STA based on the first frequency-domain interference information.

In a possible implementation of the second aspect, that the first STA sends a first registration request to the first AP includes: The first STA receives a first feature message advertised by the first AP, where the first feature message indicates that the first AP supports the frequency-domain interference information reporting feature. The first STA sends the first registration request to the first A.

In a possible implementation of the second aspect, that the first STA sends a first registration request to the first AP includes: The first STA sends the first registration request to the first AP after the first STA completes a scanning and discovery procedure, an authentication procedure, and an association procedure with the first AP.

In a possible implementation of the second aspect, the method further includes: The first STA reports a reporting type of the frequency-domain interference information to the first AP where the reporting type is periodic reporting or aperiodic reporting; and/or the first STA reports a quantity of valid reported bits of the frequency-domain interference information to the first AP.

According to a third aspect, this application provides an apparatus for scheduling a frequency-domain resource in OFDMA. The apparatus includes a unit configured to perform the method in the second aspect. The apparatus may correspondingly perform the method described in the second aspect. For related description of the unit in the apparatus, refer to the description in the second aspect. For brevity, details are not described herein again.

The method described in the second aspect may be implemented by hardware, or may be implemented by executing corresponding software by using hardware. The hardware or software includes one or more modules or units corresponding to the foregoing function, for example, a processing module or unit or a transceiver module or unit.

According to a fourth aspect, this application provides a station STA. The STA includes a processor, and the processor is coupled to a memory. The memory is configured to store a computer program or instructions, and the processor is configured to execute the computer program or the instructions stored in the memory, to perform the method in the second aspect. For example, the processor is configured to execute the computer program or the instructions stored in the memory, so that the station STA performs the method in the second aspect.

According to a fifth aspect, this application provides a method for scheduling a frequency-domain resource in OFDMA, applied to a first access point AP. The first AP supports a wireless network Wi-Fi 6 communications protocol, and a plurality of stations STAs access the first AP in an OFDMA manner. The method includes: The first AP receives first frequency-domain interference information reported by a first STA, where the first frequency-domain interference information is used to indicate that a first frequency-domain subband is an interference subband, and the first STA is one of the plurality of STAs. The first AP schedules an uplink frequency-domain resource of the first STA based on the first frequency-domain interference information, so that an uplink frequency-domain resource allocated to the first STA does not include the first frequency-domain subband.

In a Wi-Fi 6 OFDMA mode, because a bandwidth allocated to a user may be interfered with, an AP-side solution is proposed in this application: In the method for scheduling a frequency-domain resource in OFDMA provided in this application, an AP device receives STA-side frequency-domain interference information reported by a STA device, where the frequency-domain interference information indicates a STA-side frequency-domain interference subband, so that the AP device avoids, based on the STA-side frequency-domain interference information, the frequency-domain interference subband when allocating an uplink frequency-domain resource to the STA device, selects a proper RU resource, and allocates the proper RU resource to the STA device for data transmission. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation of the fifth aspect, the method further includes: The first AP receives first channel granularity information sent by the first STA, where the first channel granularity information is used to indicate that the first STA uses a first resource unit RU channel granularity, and the RU represents one or more tones in frequency domain. The first AP allocates an uplink frequency-domain resource to the first STA based on the first RU channel granularity.

In a possible implementation of the fifth aspect, the first RU channel granularity includes a 26-tone RU, a 52-tone RU, a 106-tone RU, a 242-tone RU, a 484-tone RU, a 996-tone RU, or a 2×996-tone RU, or any combination of the channel granularities.

In a possible implementation of the fifth aspect, the method further includes: The first AP sends a first query request to the first STA, where the first query request is used to request the first STA to report the first frequency-domain interference information.

In a possible implementation of the fifth aspect, the method further includes: The first AP sends a first response message to the first STA when receiving the first frequency-domain interference information reported by the first STA, where the first response message is used to indicate that the first AP receives the first frequency-domain interference information reported by the first STA.

In a possible implementation of the fifth aspect, the method further includes: The first AP receives a first registration request sent by the first STA, where the first registration request is used to apply to the first AP for registration of a frequency-domain interference information reporting feature. The first AP sends a second response message to the first STA in response to the first registration request, where the second response message is used to indicate that registration application succeeds or registration application fails. When registration application succeeds, the first AP supports in receiving the first frequency-domain interference information sent by the first STA, and schedules a frequency-domain resource of the first STA based on the first frequency-domain interference information.

In a possible implementation of the fifth aspect, the method further includes: The first AP advertises a first feature message, where the first feature message is used to indicate that the first AP supports or does not support the frequency-domain interference information reporting feature.

In a possible implementation of the fifth aspect, the method further includes: The first AP receives a first probe request message sent by the first STA, where the first probe request message includes a physical MAC address of the first STA. The first AP sends a first probe response message to the first STA based on the MAC address of the first STA, where the first probe response message is used to indicate that the first STA is scanned and discovered by the first AP.

According to a sixth aspect, this application provides an apparatus for scheduling a frequency-domain resource in OFDMA. The apparatus includes a unit configured to perform the method in the fifth aspect. The apparatus may correspondingly perform the method described in the fifth aspect. For related description of the unit in the apparatus, refer to the description in the fifth aspect. For brevity, details are not described herein again.

The method described in the fifth aspect may be implemented by hardware, or may be implemented by executing corresponding software by using hardware. The hardware or software includes one or more modules or units corresponding to the foregoing function, for example, a processing module or unit or a transceiver module or unit.

According to a seventh aspect, this application provides an access point AP. The access point AP includes a processor, and the processor is coupled to a memory. The memory is configured to store a computer program or instructions, and the processor is configured to execute the computer program or the instructions stored in the memory, to perform the method in the fifth aspect. For example, the processor is configured to execute the computer program or the instructions stored in the memory, so that the access point AP performs the method in the fifth aspect.

According to an eighth aspect, this application provides a computer-readable storage medium, and the computer-readable storage medium stores a computer program (also referred to as an instruction or code) used to implement the method in the second aspect. For example, when the computer program is executed by a computer, the computer is enabled to perform the method in the second aspect.

According to a ninth aspect, this application provides a computer-readable storage medium, and the computer-readable storage medium stores a computer program (also referred to as an instruction or code) used to implement the method in the fifth aspect. For example, when the computer program is executed by a computer, the computer is enabled to perform the method in the fifth aspect.

According to a tenth aspect, this application provides a chip, including a processor. The processor is configured to read and execute a computer program stored in a memory, to perform the method in the second aspect and any possible implementation of the second aspect. Optionally, the chip further includes a memory, and the memory is connected to the processor by using a circuit or a wire.

According to an eleventh aspect, this application provides a chip, including a processor. The processor is configured to read and execute a computer program stored in a memory, to perform the method in the fifth aspect and any possible implementation of the fifth aspect. Optionally, the chip further includes a memory, and the memory is connected to the processor by using a circuit or a wire.

According to a twelfth aspect, this application provides a chip system, including a processor. The processor is configured to read and execute a computer program stored in a memory, to perform the method in the second aspect and any possible implementation of the second aspect and the method in the fifth aspect and any possible implementation of the fifth aspect. Optionally, the chip system further includes a memory, and the memory is connected to the processor by using a circuit or a wire.

According to a thirteenth aspect, this application provides a computer program product. The computer program product includes a computer program (also referred to as an instruction or code), and when the computer program is executed by a computer, the computer is enabled to implement the method in the second aspect.

According to a fourteenth aspect, this application provides a computer program product. The computer program product includes a computer program (also referred to as an instruction or code), and when the computer program is executed by a computer, the computer is enabled to implement the method in the fifth aspect.

It may be understood that for beneficial effects of the second aspect to the fourteenth aspect, refer to related description in the first aspect. Details are not described herein again.

BRIEF DESCRIPTION OF DRAWINGS

FIG. 10 is a schematic diagram of another frame structure in a method for scheduling a frequency-domain resource in OFDMA according to an embodiment of this application;

DESCRIPTION OF EMBODIMENTS

Figures 1, 2:
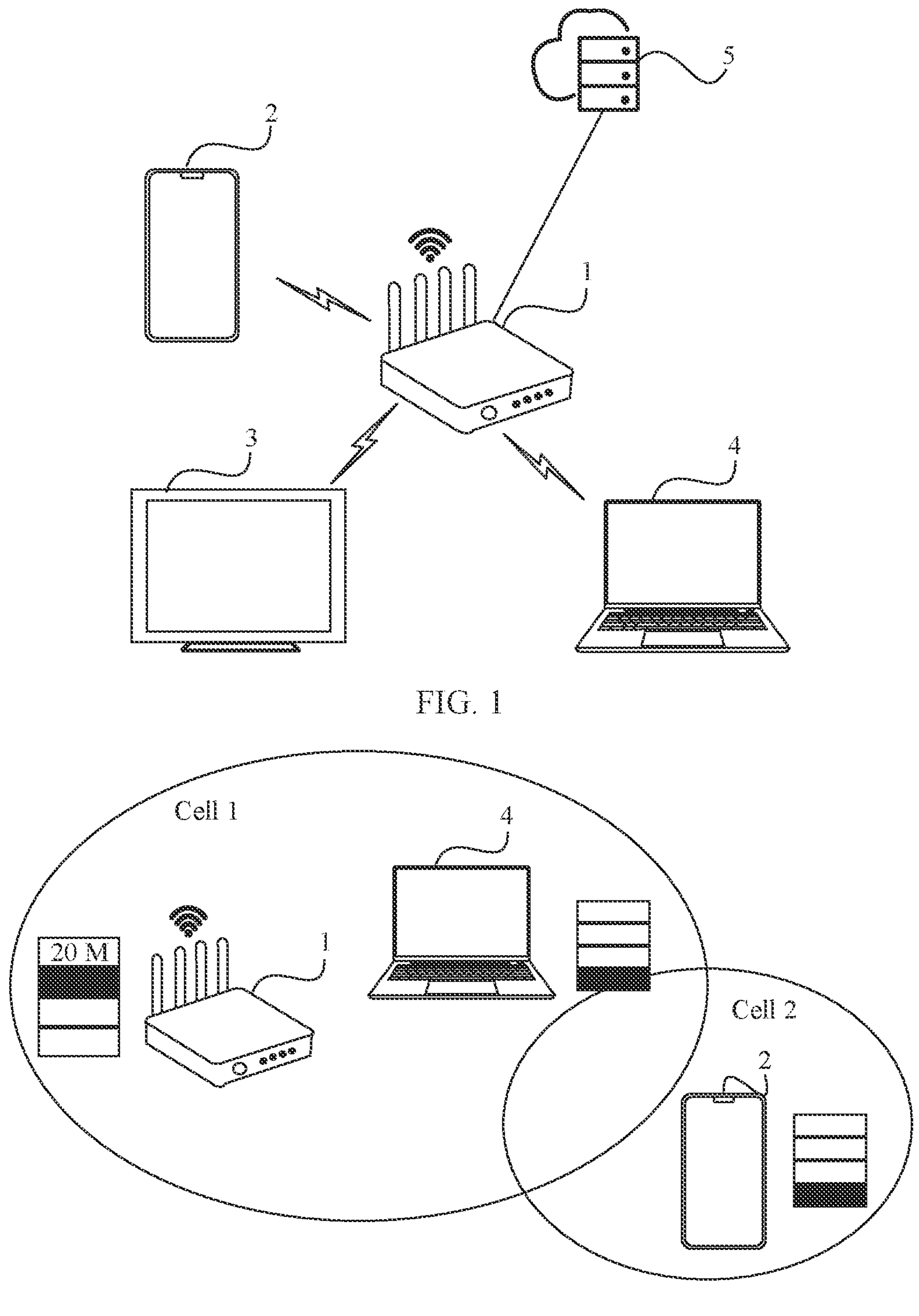
FIG. 1 is a schematic diagram of an application scenario of a method for scheduling a frequency-domain resource in OFDMA according to an embodiment of this application.
FIG. 2 is a schematic diagram in which frequency-domain interference exists in an application scenario according to an embodiment of this application.

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

In this specification, the term "and/or" is an association relationship that describes associated objects, and represents that there may be three relationships. For example, A and/or B may represent three cases: only A exists, both A and B exist, and only B exists. In this specification, the symbol "/" indicates that the associated objects are in an or relationship, for example, A/B indicates A or B.

Terms "first", "second", and the like in the specification and the claims are used to distinguish between different objects, and are not used to describe a specific sequence of the objects. For example, a first request and a second request are used to distinguish between different requests, and are not used to describe a specific sequence of the requests.

In the embodiments of this application, words such as "exemplary" or "for example" are used to indicate an example, an instance, or descriptions. Any embodiment or design solution described as "exemplary" or "for example" in the embodiments of this application should not be construed as being preferable or advantageous than other embodiments or design solutions. Specifically, the words such as "exemplary" or "for example" are used to present related concepts in a specific manner.

In the descriptions of the embodiments of this application, unless otherwise stated, "a plurality of" means two or more, for example, a plurality of processing units means two or more processing units, and a plurality of elements means two or more elements.

With an increasing prevalence of service applications such as video conferencing, wireless interaction VR, and mobile teaching, increasingly more terminal devices access a Wi-Fi network. The development of the IoT allows increasingly more smart home devices to access the Wi-Fi network. Therefore, a rate of the Wi-Fi network still needs to be continuously improved. In addition, whether more terminal devices can access the Wi-Fi network further needs to be considered to adapt to an increasing quantity of client devices and user experience requirements of different applications. Next-generation Wi-Fi needs to resolve a problem that network efficiency of the entire Wi-Fi network is reduced because more terminals are accessed. In the 802.11ax standard, technologies such as uplink MU-MIMO. OFDMA orthogonal frequency division multiple access, and 1024-QAM higher-order modulation are introduced, to resolve problems of a network capacity and transmission efficiency from aspects of spectrum resource utilization and multi-user access.

FIG. 1 is a schematic diagram of a Wi-Fi application scenario based on a wireless local area network (wireless local area net, WLAN) according to an embodiment of this application. The application scenario includes at least one access point (access point, AP) providing a Wi-Fi service and at least one station (station, STA) supporting a Wi-Fi protocol.

The access point AP may be a device configured to communicate with a station, which is referred to as an AP device below. The access point may be any device with a wireless receiving/transmission function or a chip that can be disposed in the device. The device includes but is not limited to an access point (access point, AP), a wireless relay node, a wireless backhaul node, a transmission point (transmission point, TP) or a transmission and reception point (transmission and reception point, TRP), or the like in a wireless fidelity (wireless fidelity, Wi-Fi) system, or may be a base station supporting a 5G protocol. In the WLAN, the access point AP is equivalent to a hub of a wired network and can be connected to one or more stations STAs. Logically, the access point AP is a center point of the WLAN, and all wireless signals in the WLAN are exchanged by using the access point AP.

The station STA includes but is not limited to: user equipment, an access terminal, a subscriber unit, a subscriber station, a mobile station, a mobile console, a remote station, a remote terminal, a mobile device, a user terminal, a wireless communications device, a user agent, or a user apparatus. The station may alternatively be a cellular phone, a cordless phone, a session initiation protocol (session initiation protocol, SIP) phone, a station in a wireless local area network, an in-vehicle device, a wearable device, a terminal device in a future 5G network, a terminal device in a future evolved public land mobile network (public land mobile network, PLMN), or the like. For example, a station STA device may be a mobile phone built with a Wi-Fi module or a computer equipped with a wireless network card. The STA device may be a mobile device or a non-mobile device.

As shown in FIG. 1, a system architecture includes an AP device 1 and at least one STA device, and the at least one STA device is wirelessly connected to the AP device 1 based on the Wi-Fi protocol. For example, the at least one STA device may include a mobile phone 2, a notebook computer 3, and/or a television 4 in FIG. 1. Certainly, the at least one STA device may be another possible terminal device and may be specifically determined based on an actual use requirement, which is not limited in this embodiment of this application.

The at least one STA device may access a same Wi-Fi network by using an AP device to implement various services. For example, the mobile phone 2 may obtain data from a network server 5 or upload data to the network server 5 by using a Wi-Fi network, to implement an Internet access service. Alternatively, the mobile phone 2 may establish a connection to the notebook network 3 by using the Wi-Fi network, and the mobile phone 2 and the notebook network 3 may transmit data to each other by using a channel of the AP device 1, to implement a data transmission service. Alternatively, the mobile phone 2 may transmit screen-projecting data to the television 4 by using the channel of the AP device 1, so that an image displayed by the mobile phone may be projected to a screen of the television for display, to implement a screen-projecting service. Certainly, the at least one STA device may be further interconnected by using a Wi-Fi local area network to implement other services, which may be specifically determined based on an actual use requirement, and is not limited in this embodiment of this application.

It should be noted that when a plurality of STA devices simultaneously access a Wi-Fi channel to transmit data through an air interface, an unlicensed (unlicensed) spectrum used by Wi-Fi may suffer from various interference. For example, an interference source may be another subband or different systems with a same frequency. Consequently, interference may exist in a Wi-Fi cell and between Wi-Fi cells. For example, a subband in a large bandwidth (for example, 160 MHz, 80 MHz, 40 MHz, or 20 MHz) is interfered with or frequency selective fading of the subband is relatively large, which affects Wi-Fi throughput. A bandwidth allocated to each user may be interfered with, which affects transmission of an entire physical protocol data unit (physical protocol data unit, PPDU), causing worse user experience.

As shown in FIG. 2, in a scenario in which a Wi-Fi channel resource is 20 MHz, interference exists on the Wi-Fi channel resource between a Wi-Fi network cell 1 and a Wi-Fi network cell 2, and a delay in a real-time game, video freezing, or the like may occur in user equipment in the cell, which affects user experience.

To facilitate understanding of the embodiments of this application, some terms in the embodiments of this application are explained below, to facilitate understanding by a person skilled in the art.

(1) OFDMA

Figure 3:
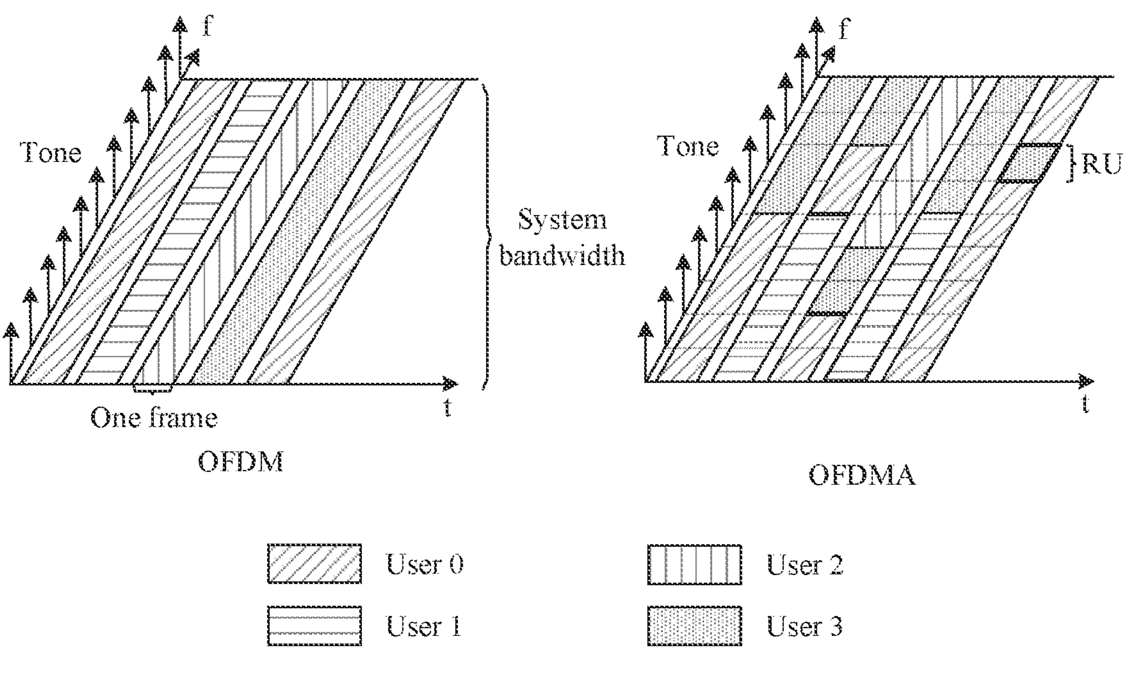
FIG. 3 is a schematic diagram of distribution of OFDMA spectra applied to a method for scheduling a frequency-domain resource in OFDMA according to an embodiment of this application.

In a WLAN standard prior to 802.11ax, data is transmitted in an orthogonal frequency division multiplexing (orthogonal frequency division multiple. OFDM) mode, and different users may be distinguished by using a time segment. As shown in FIG. 3, in the OFDM mode, a user 0, a user 1, a user 2, and a user 3 respectively occupy different time segments, and only one user can perform transmission (uplink transmission) in each time segment. In other words, one user occupies all tones in each time segment. In this case, each user uses an entire allocated system bandwidth, while a remaining user needs to wait in turn.

In the 802.1 lax WLAN standard, an OFDMA mode is introduced for data transmission. In the OFDMA mode, a group of tones are allocated to different users and multi-access is added to an OFDM system, so that a plurality of users multiplex a channel resource. In other words, OFDMA is an OFDM-based multi-user solution. A group of tones are allocated to different users on a channel, and one channel may simultaneously transmit data of a plurality of users, so that the plurality of users simultaneously perform transmission. As shown in FIG. 3, in the OFDMA mode, one time segment may be used to simultaneously transmit data packets of the user 1, the user 2, the user 3, and a user 4.

OFDMA has the following advantages over OFDM: (1) finer channel resource allocation: (2) providing better quality of service (quality of service, QoS), which can reduce a delay; and (3) more concurrent users and a higher user bandwidth.

(2) RU

In the OFDMA mode in the 802.11ax WLAN standard, resources of an entire channel are divided into a plurality of time-frequency resource blocks with a fixed size, each time-frequency resource block is a resource unit (resource unit, RU), and each RU includes at least 26 tones (tone or ton). Different users may be distinguished based on the time-frequency resource block RU.

As shown in FIG. 3, in the OFDMA mode, user data of the user 0, the user 1, the user 2, and the user 3 may be carried on different RUs. As seen from the entire time-frequency resource, a plurality of users may simultaneously transmit data in each time segment.

The following is defined in an OFDMA WLAN: An RU includes 26 tones and is denoted as a 26-tone RU, an RU includes 52 tones and is denoted as a 52-tone RU, and an RU includes 106 tones and is denoted as a 106-tone RU. In addition, some other RUs are further defined in the OFDMA WLAN: a 242-tone RU, a 484-tone RU, a 996-tone RU, and a 2×996-tone RU.

In OFDMA, an indication manner of a resource unit allocation subfield depends on tone distribution in different PPDU bandwidths in 802.11ax. In a multi-user scenario, tones allocated to users are grouped into RUs, so that a plurality of users can synchronously transmit data.

Figure 4:
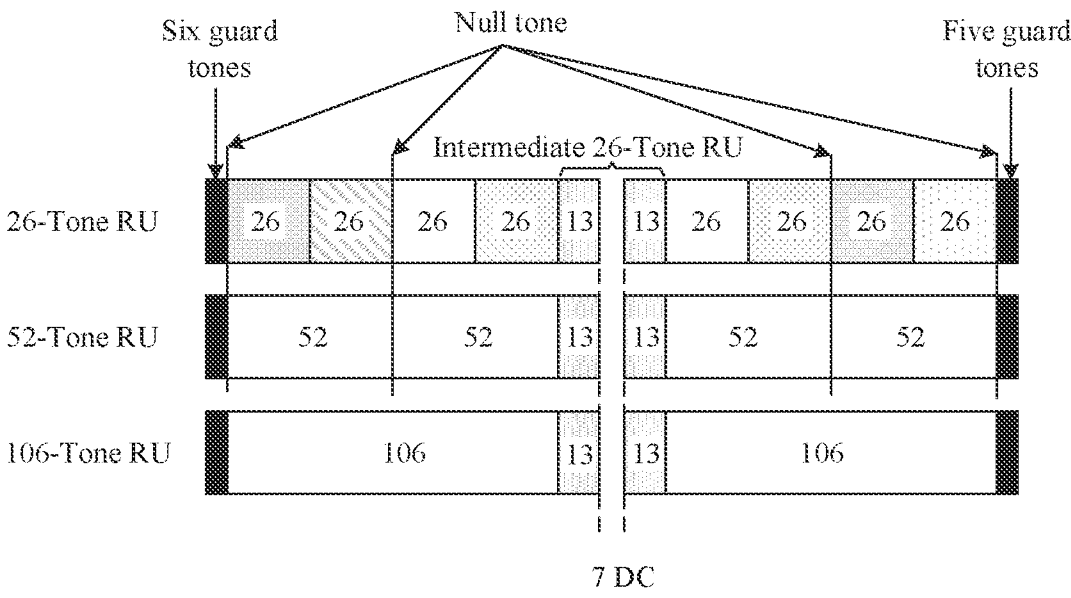
FIG. 4 is a schematic diagram of different channel granularities applied to a method for scheduling a frequency-domain resource in OFDMA according to an embodiment of this application.

For example, FIG. 4 is a schematic diagram of tone distribution and RU distribution in a case of 20 MHz. As shown in FIG. 4, in an OFDMA bandwidth of 20 MHz, the entire bandwidth may include nine 26-tone RUs, or the entire bandwidth may include four 52-tone RUs, or the entire bandwidth may include two 106-tone RUs, or the entire bandwidth may include one 242-tone RU, or certainly may include various combinations of the 26-tone RU, the 52-tone RU, and the 106-tone RU. It should be noted that an intermediate 26-tone RU including two 13-tone subunits exists in the middle of the entire bandwidth. In addition, the entire bandwidth further includes a direct-current component (7 DC), a guard tone, and a null tone.

With reference to FIG. 4, when an AP device supports the 26-tone RU on the 20 MHz bandwidth, the user 0, the user 1, the user 2, and the user 3 may separately use at least one 26-tone RU on the 20 MHz bandwidth. The four STA devices may simultaneously transmit data to the AP device (send data to the AP device and/or receive data from the AP device), and a total bandwidth occupied by all the STA devices should be less than or equal to 20 MHz.

For another example, with reference to FIG. 4, when an AP device supports the 52-tone RU on the 20 MHz bandwidth, each STA device in the user 0, the user 1, the user 2, and the user 3 may use at least one 52-tone RU on the 20 MHz bandwidth. The four STA devices may simultaneously transmit data to the AP device, and a total bandwidth occupied by all the STA devices should be less than or equal to 20 MHz.

For another example, with reference to FIG. 4, when an AP device supports the 52-tone RU on the 20 MHz bandwidth, each STA device in the user 0, the user 1, the user 2, and the user 3 may use at least one 52-tone RU on the 20 MHz bandwidth. The four STA devices may simultaneously transmit data to the AP device, and a total bandwidth occupied by all the STA devices should be less than or equal to 20 MHz.

After OFDMA is introduced into Wi-Fi 6, frequency-domain interference on an AP side and that on a STA side may be asymmetric. If an uplink resource on the STA side is scheduled depending on only frequency-domain subband information perceived on the AP side, optimal performance of resource scheduling cannot be achieved. Based on this, in the solutions of this application, it is proposed that an STA device reports STA-side frequency-domain subband information to an AP device. The frequency-domain subband information indicates an interference subband, and therefore the frequency-domain subband information is also referred to as frequency-domain interference information. Then, the AP device may avoid, based on the STA-side frequency-domain subband information, the interference subband when allocating an uplink resource to the STA device, to improve a gain of an entire Wi-Fi cell.

In a Wi-Fi 6 communications standard, OFDMA is used for data transmission. The STA device may actively report the STA-side frequency-domain subband information, so that the AP device avoids an interference frequency band in frequency domain of a STA-side subband when allocating an uplink time-frequency resource to the STA device. Because interference frequency bands in frequency domain of different tones are different, an optimal RU resource may be selected based on the STA-side frequency-domain subband information for data transmission. In the solution of this application, in a scenario with a large OFDMA bandwidth, anti-interference performance can be significantly improved.

In the embodiments of this application, the STA device reports subband interference information in an unlicensed frequency domain to the AP device, so that the AP device avoids the interference subband when allocating an uplink resource to the STA device. In this way, the AP device cooperates and interacts with the STA device to reduce impact of frequency-domain interference on a gain of a Wi-Fi cell.

First, the STA device negotiates with the AP device in advance on a frequency-domain information reporting feature, and this process may be referred to as a STA-side frequency-domain information reporting feature registration process. Then, the STA device reports the frequency-domain interference information of the STA device to the AP device, and this process may be referred to as a STA-side frequency-domain interference information reporting process.

Figure 5:
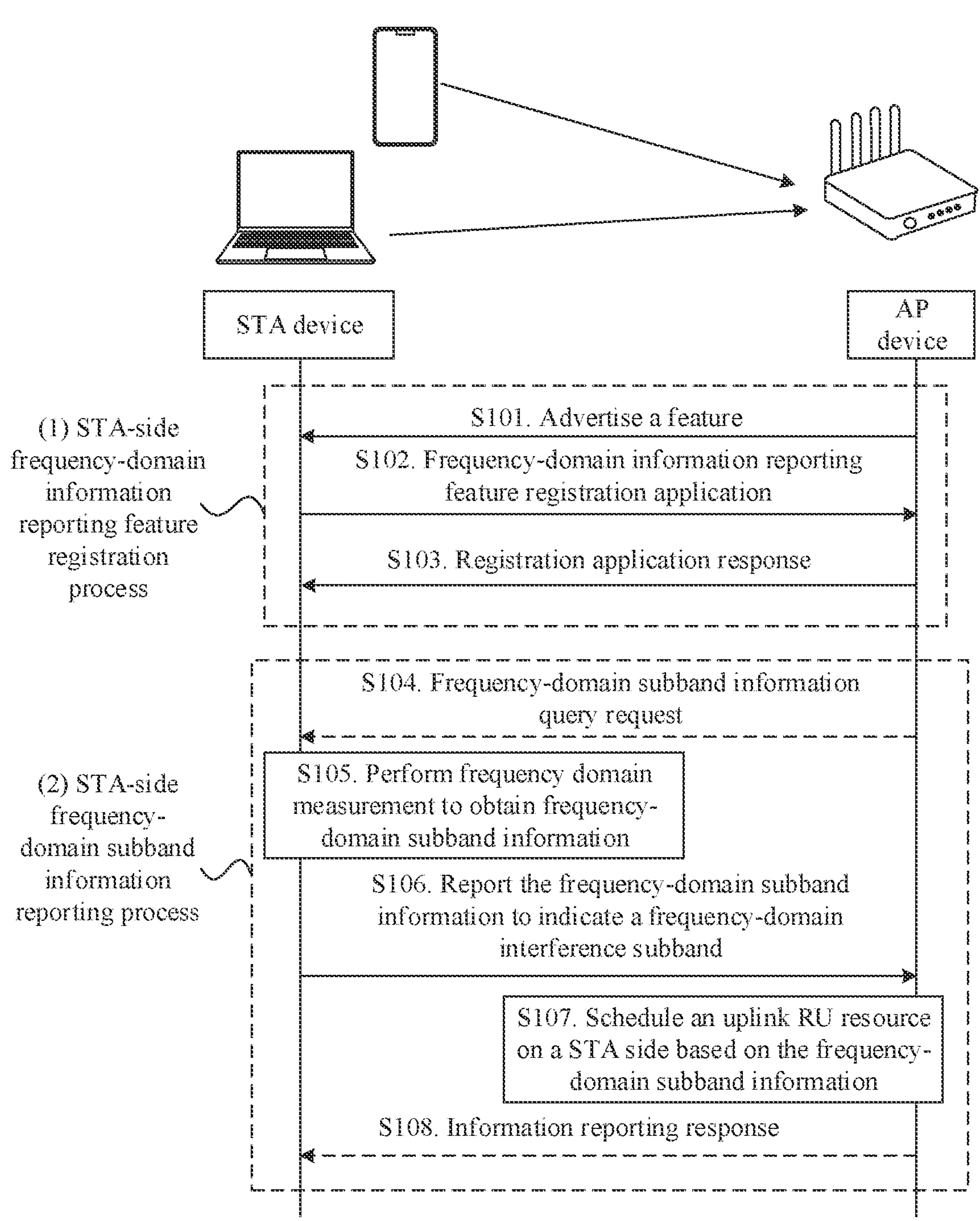
FIG. 5 is a first schematic flowchart of a method for scheduling a frequency-domain resource in OFDMA according to an embodiment of this application.

As shown in FIG. 5, the STA-side frequency-domain information reporting feature registration process may include S101 to S103, and the STA-side frequency-domain information reporting process may include S104 to S108. Descriptions are provided below with reference to FIG. 5. It should be noted that a STA-side device may include at least one STA device.

(1) STA-Side Frequency-Domain Information Reporting Feature Registration Process S101. The AP device advertises a feature (Beacon<Vendor-specific> freq-inter-feature-flag Bcn), and the STA device receives the advertisement.

S102. The STA device sends a frequency-domain information reporting feature registration application message (Rsv-Ctr-Frame freq-inter-feature-reg-req) to the AP device.

S103. The AP device sends a registration application response message (Rsv-Ctr-Frame freq-inter-feature-reg-rsp) to the STA device.

The AP device feeds back the registration application response message to the STA device, that is, a registration application result, for example, registration application succeeds or registration application fails.

After the STA device succeeds in registration, the STA device may report the STA-side frequency-domain interference information to the AP device.

(2) STA-Side Frequency-Domain Interference Information Reporting Process

S104. The AP device sends a frequency-domain interference information query request to the STA device.

It should be noted that S104 is optional. For example, step S104 may or may not be performed in the STA-side frequency-domain interference information reporting process, which may be specifically determined based on an actual use requirement and is not limited in this embodiment of this application.

S105. The STA device periodically performs frequency domain measurement or performs frequency domain measurement in response to the frequency-domain interference information query request sent by the AP device, to obtain frequency-domain interference information.

Frequency domain measurement is performed to obtain a measurement value based on a frequency-domain subband, that is, obtain the frequency-domain interference information, to indicate a STA-side frequency-domain interference subband.

When step S104 is not performed, the STA device actively periodically performs frequency domain measurement. When step S104 is performed, the STA device performs frequency domain measurement in response to the frequency-domain interference information query request sent by the AP device.

S106. The STA device reports the frequency-domain interference information (Rsv-Ctr-Frame freq-inter-ul-info-req) to the AP device.

The frequency-domain interference information reported by the STA device to the AP device indicates the STA-side frequency-domain interference subband.

S107. The AP device receives the frequency-domain interference information reported by the STA device, and schedules (that is, determines) an uplink frequency-domain resource (that is, an RU resource) on the STA side based on the STA-side frequency-domain interference information.

The AP device avoids, based on the STA-side frequency-domain interference information, the frequency-domain interference subband when allocating an uplink frequency-domain resource to the STA device, selects a proper RU resource, and allocates the proper RU resource to the STA device for data transmission. In this way, frequency band interference in a multi-user access scenario can be avoided, and frequency-domain resource utilization can be improved.

S108. The AP device sends an information reporting response (Rsv-Ctr-Frame freq-inter-ul-info-rsp) to the STA device.

The information reporting response is an acknowledgement response, and the AP device feeds back, to the STA device, that the frequency-domain interference information is received. It should be noted that S108 is optional. In other words, step S108 may or may not be performed in the STA-side frequency-domain interference information reporting process, which may be specifically determined based on an actual use requirement and is not limited in this embodiment of this application.

Figure 6:
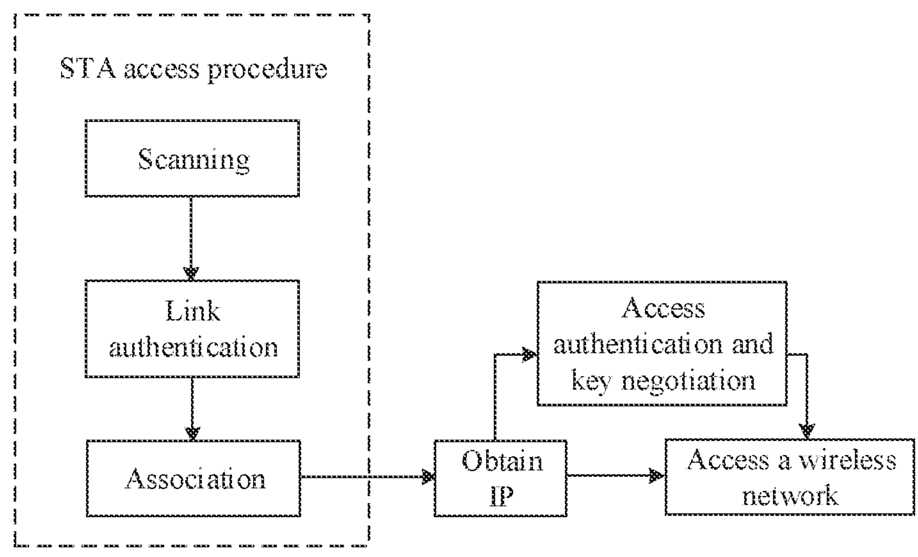
FIG. 6 is a second schematic flowchart of a method for scheduling a frequency-domain resource in OFDMA according to an embodiment of this application.

FIG. 6 is a schematic diagram of a procedure in which a STA device accesses a Wi-Fi cell. Referring to FIG. 6, first, after a scanning procedure, a link authentication procedure, and an association procedure are performed, the STA device establishes a connection to the AP device, to complete a STA access procedure. Then, the AP device obtains IP information of the STA device to perform access authentication and key negotiation, and then the STA device accesses a wireless network, that is, accesses the Wi-Fi cell.

Figure 7:
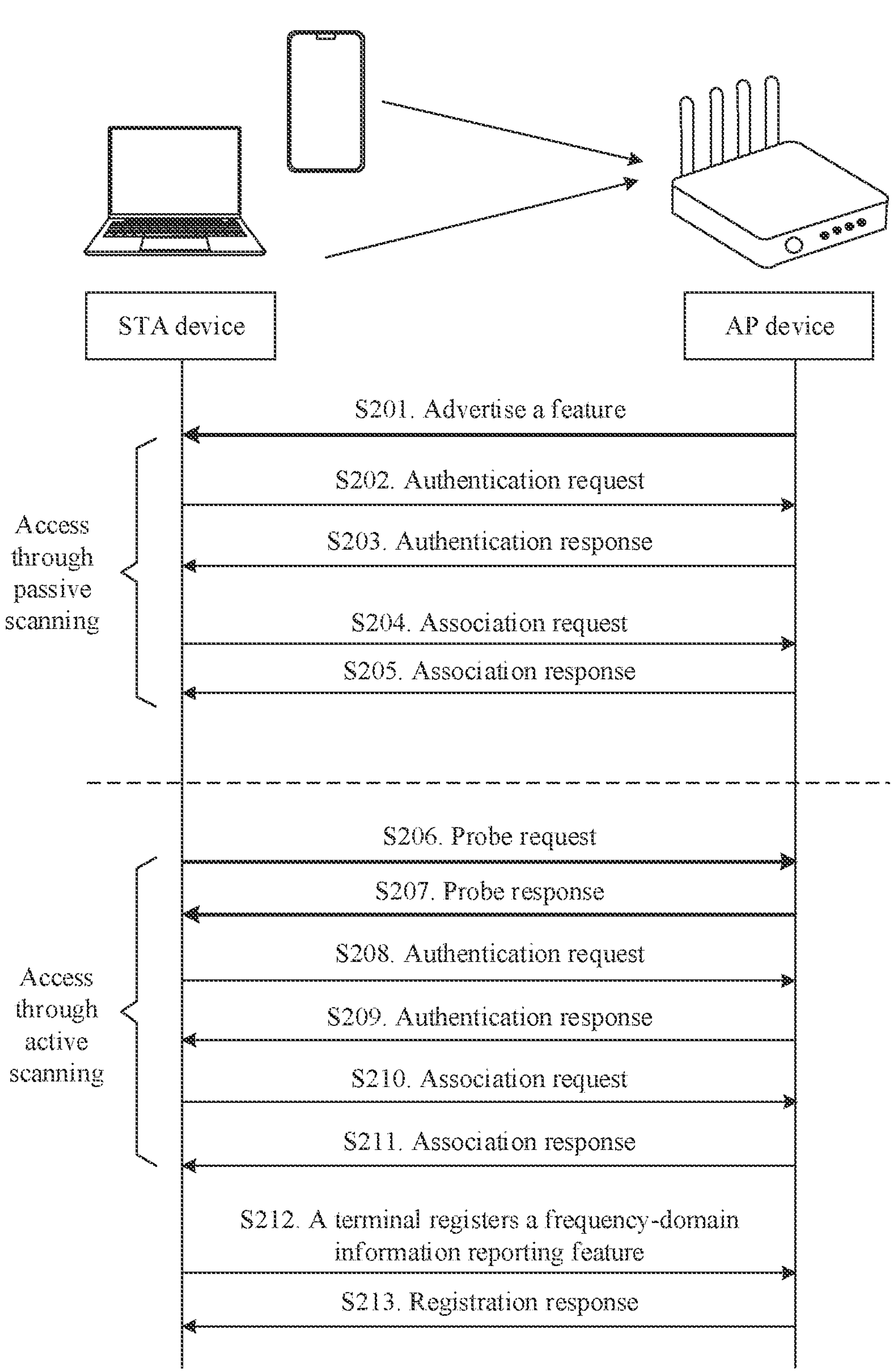
FIG. 7 is a third schematic flowchart of a method for scheduling a frequency-domain resource in OFDMA according to an embodiment of this application.

Correspondingly, an access process may be divided into a passive access procedure and an active access procedure. It should be noted that after completing authentication and authentication and association to access the Wi-Fi cell, the STA device starts the STA-side frequency-domain information reporting feature registration process. An example of the passive access procedure or the active access procedure and the STA-side frequency-domain information reporting feature registration process is described below with reference to FIG. 7. Descriptions are provided below with reference to FIG. 6 and FIG. 7.

S201. The AP device advertises a feature (Beacon<Vendor-specific> freq-inter-feature-flag Bcn).

The AP device advertises the feature in a "scanning phase", and the scanning phase may be divided into a passive scanning procedure and an active scanning procedure. It should be noted that a beacon (beacon) in this specification may be referred to as bcn for short.

S202. After receiving the advertisement, the STA device sends an authentication request (Auth req) to the AP device.

S203. The AP device sends an authentication response (Auth resp) to the STA device to indicate that authentication succeeds.

S204. The STA device sends an association request (Association req) to the AP device.

S205. The AP device sends an association response (Association resp) to the STA device to indicate that association succeeds.

The steps S201 to S205 are a procedure in which the STA device is passively scanned to access the Wi-Fi cell.

S206. The STA device sends a probe request (probe req) to the AP device.

For example, when Wi-Fi is enabled, the STA device enables an active scanning mode, and sends a beacon to the AP device, where the beacon includes the probe request (probe request). The probe request includes a media access control address (media access control address, MAC) of the STA device.

S207. The AP device sends a probe response (probe resp) to the STA device.

The AP device obtains the MAC address of the STA device based on the probe request, and then sends the probe response.

S208. The STA device sends an authentication request (Auth req) to the AP device.

S209. The AP device sends an authentication response (Auth resp) to the STA device to indicate that authentication succeeds.

S210. The STA device sends an association request (Association req) to the AP device.

S211. The AP device sends an association response (Association resp) to the STA device to indicate that association succeeds.

The steps S206 to S211 are a procedure in which the STA device is actively scanned to access the Wi-Fi cell.

It should be noted that either the steps S201 to S205 or the steps S206 to S211 are performed. Further, S212 and S213 continue to be performed after the steps S201 to S205 are performed, or S212 and S213 continue to be performed after the steps S206 to S211 are performed.

S212. The STA device registers a frequency-domain information reporting feature (Rsv-Ctr-Frame freq-inter-feature-reg-req) with the AP device.

S213. The AP device sends a registration response (Rsv-Ctr-Frame freq-inter-feature-reg-rsp) to the STA device to indicate that registration succeeds.

In this way, after the STA accesses the Wi-Fi cell, the STA device registers the frequency-domain information reporting feature with the AP device.

In this embodiment of this application, through active scanning and passive scanning in a Wi-Fi standard, it can be ensured that the AP device and the STA device perform feature registration, to meet an end-to-end optimization premise.

It should be noted that three types of frames are stipulated in the 802.11 protocol, which are respectively a data frame (data frame), a control frame (control frame), and a management frame (management frame). The management frame is used to manage access and disconnection of a wireless client. For example, the management frame includes an association request (Association request), an association response (Association response), a probe request (Probe request), a probe response (Probe response), a beacon (Beacon), and the like. The management frame carries some information fields with a fixed size and information elements (information element, IE) with a variable size. The data frame puts data in an upper-layer protocol into a frame body for transmission. The control frame is mainly used to assist the data frame in transmission, and may be used to manage access of a wireless medium, provide reliability of a MAC layer, and ensure stable transmission of data. The control frame not only can control a transmission rate, but also can be used to clear a channel, negotiate and provide a unicast notification, and so on.

Figure 8:
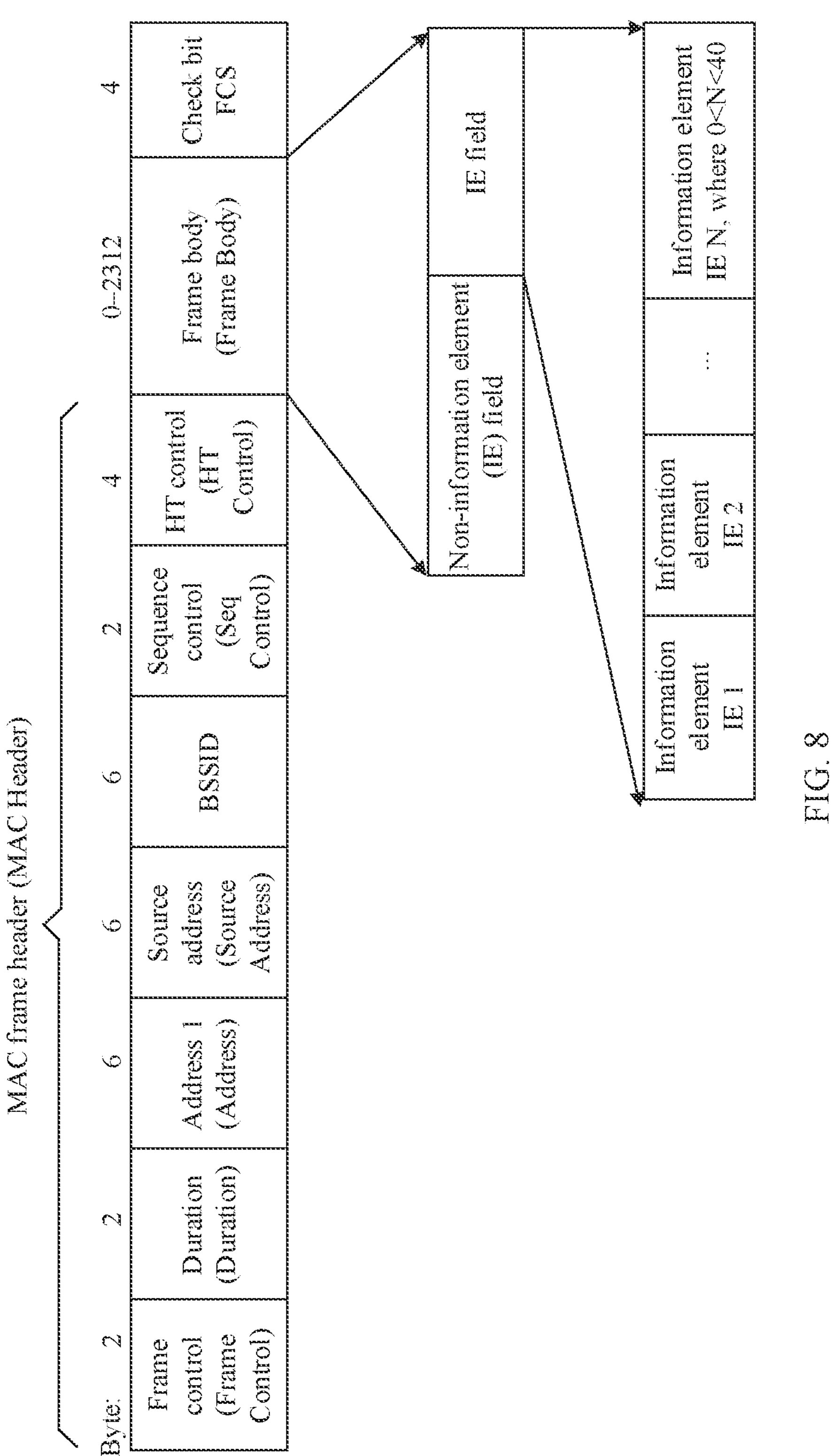
FIG. 8 is a schematic diagram of a frame structure in a method for scheduling a frequency-domain resource in OFDMA according to an embodiment of this application.

FIG. 8 illustrates a beacon frame format defined in the 802.11 protocol. As shown in FIG. 8, the beacon frame format includes a MAC frame header (MAC Header) field, a frame body (Frame Body) field, and a check bit (FCS) field. The MAC frame header field includes a frame control field (2 bytes), a duration field (2 bytes), an address 1 field (6 bytes), a source address field (6 bytes), a basic service set identifier (denoted as BSSID) field (6 bytes), a sequence control field (2 bytes), and an HT control field (4 bytes).

Figure 9:
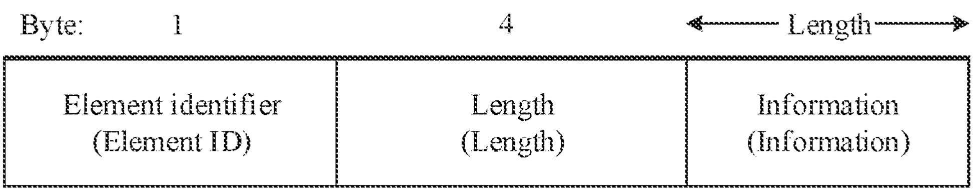
FIG. 9 is a schematic diagram of an information element field in a method for scheduling a frequency-domain resource in OFDMA according to an embodiment of this application.

The frame body field (0 to 2312 bytes) includes a non-IE field and an IE field. The IE field includes information elements IE 1, IE 2, . . . , and IE N. The information element IE is a component with a variable length in the management frame. As shown in FIG. 9, the information element IE usually includes an element identifier (Elenment ID) field, a length (length) field, and an information (information) field with an uncertain length.

In this embodiment of this application, a vendor-specific information element (<vendor-specific> IE) may be added to a beacon frame (Beacon frame) and a probe response frame (Probe Response frame). An AP side periodically sends a beacon for negotiation and relationship control between the AP side and a STA side, such as association, authentication, and synchronization.

For example, a log (log) of a vendor-specific identifier in the beacon frame (vendor specific id in beacon) is Vendor Specific ID=221, that is, the vendor-specific identifier is fixedly 221 as defined in the 802.11 protocol.

Examples of the solutions provided in the embodiments of this application are separately described below from aspects of a feature registration procedure and a frequency-domain information reporting procedure.

[Feature Registration Procedure]

First, in the solution of this application, in a process of advertising the feature by the AP device, a vendor-specific beacon frame field (beacon vendor specific) is added. For example, the beacon frame field may include the following information:

ID=221, Len=9, OUT=xx-xx-xx (Honor OUI), value=6 byte

Value[6]=Value[0]: IE-type 0x01 (this IE is used to indicate a feature), Value[1]: rsv;

Value[2:3]: feature enum, 0x0002 (used to indicate feature enumeration and represent a frequency-domain interference indication method)

Value[4:5]: feature value, 0x0001 (1 indicates that a current device supports the feature, and 0 indicates that a current device does not support the feature)

Value[6:7]: feature 16 bit-crc

It may be learned from the foregoing information that, the AP device advertises feature information. In the beacon frame field, a feature may be indicated by using the IE, the frequency-domain interference indication method may be represented by feature enumeration, and the feature value may be used to indicate whether a current device supports the feature.

A frame format of a MAC packet and a frame control field (Frame control field) in the frame format are described below with reference to FIG. 10. The beacon frame format includes the frame control field (2 bytes), a duration/identifier field (2 bytes), an address 1 field (6 bytes), an address 2 field (6 bytes), an address 3 field (6 bytes), a sequence control field (0 or 2 bytes), an address 4 field (6 bytes), a quality of service (denoted as QoS) field (0 or 2 bytes), an HT control field (0 or 4 bytes), a frame body frame, and a check bit field.

The frame control field includes a protocol version field, a type (Type) field, a subtype (subtype) field, a to (DS) field, a from DS field, a more segmentation field, a retransmission field, a power management field, a more data field, a protected frame field, and a sequence number field.

The type field identifies a specific frame type to which the frame belongs. For example, the type field 00 represents a management frame, and the type field 01 represents a control frame. Further, the subtype field identifies a specific frame in the frame type. For example, if the type field is 00 and the subtype field is 0000, it indicates an association request frame in the management frame; or if the type field is 00 and the subtype field is 0001, it indicates an association response frame in the management frame.

In this embodiment of this application, in the MAC packet, the Type (frame type) indicates a control frame or a management frame, the Subtype (frame subtype) indicates specific information carried in the control frame or the management frame, and a Payload (payload) carries the information.

It should be noted that the Subtype may be functions of the control frame and the management frame that are stipulated in a protocol, such as request to send (request to send, RTS) and clear to send (clear to send. CTS). In the solution of this application, it is proposed that a reserved field is used to define the functions of the management frame and the control frame, that is, transmitting frequency band interference information. The frequency-domain interference information is carried in a frame body of the MAC packet.

The following Table 1 shows various subtypes and corresponding descriptions in the 802.11 protocol when the frame t is the management frame. The various subtypes in the management frame are described below with reference to Table 2

TABLE 1

| Type value | Type description | Subtype value | Subtype description |
|---|---|---|---|
| 00 | Management frame | 0000 | Association request (Association Request) |
| 00 | Management frame | 0001 | Association response (Association response) |
| 00 | Management frame | 0010 | Reassociation request (Reassociation request) |
| 00 | Management frame | 0011 | Reassociation response (Reassociation response) |
| 00 | Management frame | 0100 | Probe request (Probe request) |
| 00 | Management frame | 0101 | Probe response (Probe response) |
| 00 | Management frame | 0110 | Timing advertisement (Timing Advertisement) |
| 00 | Management frame | 0111 | Reserved (Reserved) |
| 00 | Management frame | 1000 | Beacon (Beacon) |
| 00 | Management frame | 1001 | Announcement traffic indication message (ATIM) |
| 00 | Management frame | 1010 | Disassociation (Disassociation) |
| 00 | Management frame | 1011 | Identity authentication (Authentication) |
| 00 | Management frame | 1100 | Identity deauthentication (Deauthentication) |
| 00 | Management frame | 1101 | Action (Action) frame |
| 00 | Management frame | 1110 | Action No Ack (Action No Ack) frame |
| 00 | Management frame | 1111 | Reserved (Reserved) |

As shown in Table 1, in the MAC packet, the frame type value indicates that the MAC packet is the management frame, and the frame subtype value indicates specific information carried in the management frame. The reserved field indicated by the frame subtype value 1111 may indicate that the MAC packet carries the frequency-domain interference information.

A management frame is used as an example below to describe an example of a procedure in which a STA side and an AP side implement feature registration by exchanging the management frame through an air interface.

First, code is used below to list an example of feature registration application information carried in the management frame.

Frame Control.type value: 00; frame control.subtype: 1111; (management frame; reserved field)

Frame Body.dataByte[0-1]: 0x0002 (used to indicate feature enumeration and represent a frequency-domain interference indication feature, which is the same as that in the bcn)

Frame Body.dataByte[2-3]: 0x0001 (msg type feature registration application)

Frame Body.dataByte[4-7]: 0x00000000 (reserved field)

It may be learned from the foregoing information exchanged through an air interface by using the management frame that, the STA device sends the MAC packet to the AP device, where the MAC packet is the management frame, the frame body of the MAC packet carries the feature registration application information, and the reserved field of the MAC packet indicates that the frame body carries the feature registration application information. In this way, the STA side initiates registration application to the AP side.

Then, code is used below to list an example of feature registration application result information (application succeeds or application fails) carried in the management frame.

Frame Body.dataByte[0-1]: 0x0001 (used to indicate feature enumeration and represent a frequency-domain interference indication feature, which is the same as that in the bcn)

Frame Body.dataByte[2-3]: 0x0002 (msg type feature registration application feedback)

Frame Body.dataByte[4-5]: 0x0000 (application result, where 0 indicates that application succeeds)

Frame Body.dataByte[6-7]: 0x0000 (reserved)

It may be learned from the foregoing information exchanged through an air interface by using the management frame that, the AP device sends the MAC packet to the STA device, where the frame body of the MAC packet carries the feature registration application feedback information, to notify the STA device that registration application succeeds. The reserved field of the MAC packet indicates that the frame body carries the feature registration application feedback information.

Frame Body.dataByte[0-1]: 0x0001 (used to indicate feature enumeration and represent a frequency-domain interference indication feature, which is the same as that in the bcn)

Frame Body.dataByte[2-3]; 0x0003 (msg type feature registration application feedback)

Frame Body.dataByte[4-5]: 0x000 (application result, where 1 indicates that application fails)

Frame Body.dataByte[6-7]: 0x0000 (error code of a failure cause, where 0 represents feature disabling, 1 represents others, and so on)

It may be learned from the foregoing information exchanged through an air interface by using the management frame that, the AP device sends the MAC packet to the STA device, where the frame body of the MAC packet carries the feature registration application feedback information, to notify the STA device that registration application fails and notify a failure cause value. The reserved field of the MAC packet indicates that the frame body carries the feature registration application feedback information.

The following Table 2 shows various subtypes and corresponding descriptions in the 802.11 protocol when the frame type is the control frame. The various subtypes in the control frame are described below with reference to Table 2.

TABLE 2

| Type value | Type description | Subtype value | Subtype description |
|---|---|---|---|
| 01 | Control frame | 0000-0001 | Reserved (Reserved) |
| 01 | Control frame | 0010 | Trigger (trigger) |
| 01 | Control frame | 0011 | Tracking acknowledgement (TACK) |
| 01 | Control frame | 0100 | Beamforming report (Beamforming Report Poll) |
| 01 | Control frame | 0101 | Announcement (VHT/HE NDP Announcement) |
| 01 | Control frame | 0110 | Control frame extension (Control Frame Extension) |
| 01 | Control frame | 0111 | Control wrapper (Control Wrapper) |
| 01 | Control frame | 1000 | Aggregation acknowledgement request (Block Ack Request) |
| 01 | Control frame | 1001 | Aggregation acknowledgement (Block Ack) |
| 01 | Control frame | 1010 | Power save-poll (PS-Poll) |
| 01 | Control frame | 1011 | Request to send (RTS) |
| 01 | Control frame | 1100 | Clear to send (CTS) |
| 01 | Control frame | 1101 | Acknowledgement (ACK) |
| 01 | Control frame | 1110 | Contention free-End (CF-End) |
| 01 | Control frame | 1111 | CF-End + Contention free-acknowledgement (CF-ACK) |

As shown in Table 2, in the MAC packet, the frame type value indicates that the MAC packet is a control frame, and the frame subtype value indicates specific information carried in the control frame. The reserved field indicated by the frame subtype value 0000-0001 may indicate that the MAC packet carries the frequency-domain interference information.

A control frame is used as an example below to describe an example of a procedure in which a STA side and an AP side implement feature registration by exchanging the control frame through an air interface.

First, code is used below to list an example of feature registration application information carried in the control frame.

Frame Control.type value: 01; frame control.subtype: 0000, (control frame: reserved field)

Frame Body.dataByte[0-1]: 0x0002 (used to indicate feature enumeration and represent a frequency-domain interference indication feature, which is the same as that in the bcn)

Frame Body.dataBytel2-31: 0x0001 (msg type feature registration application)

Frame Body.dataByte[4-7]: 0x00000000 (reserved field)

It may be learned from the foregoing information exchanged through an air interface by using the control frame that, the STA device sends the MAC packet to the AP device, where the MAC packet is the control frame, the frame body of the MAC packet carries the feature registration application information, and the reserved field of the MAC packet indicates that the frame body carries the feature registration application information. In this way, the STA device initiates registration application to the AP device.

Then, code is used below to list an example feature registration application result information (application succeeds or application fails) carried in the control frame.

Frame Body.dataByte[0-1]: 0x0002 (used to indicate feature enumeration and represent a frequency-domain interference indication feature, which is the same as that in the bcn)

Frame Body.dataByte[2-3]: 0x0002 (msg type feature registration application feedback)

Frame Body.dataByte[4-5]: 0x0000 (application result, where 0 indicates that application succeeds)

Frame Body.dataByte[6-7]: 0x000 (reserved)

It may be learned from the foregoing information exchanged through an air interface by using the control frame that, the AP device sends the MAC packet to the STA device, where the frame body of the MAC packet carries the feature registration application feedback information, to notify the STA device that registration application succeeds. The reserved field of the MAC packet indicates that the frame body carries the feature registration application feedback information.

Frame Body.dataByte[0-1]: 0x0002 (used to indicate feature enumeration and represent a frequency-domain interference indication feature, which is the same as that in the bcn)

Frame Body.dataByte[2-3]; 0x0003 (msg type feature registration application feedback)

Frame Body.dataByte[4-5]:0x0001 (application result, where 1 indicates that application fails)

Frame Body.dataByte[6-7]: 0x0000 (error code of a failure cause, where 0 represents feature disabling, 1 represents others, and so on)

It may be learned from the foregoing information exchanged through an air interface by using the control frame that, the AP device sends the MAC packet to the STA device, where the frame body of the MAC packet carries the feature registration application feedback information, to notify the STA device that registration application fails and notify a failure cause value. The reserved field of the MAC packet indicates that the frame body carries the feature registration application feedback information.

The management frame and the control frame are used as examples above to describe an example of a process in which the STA side applies to the AP side for feature registration and the AP side feeds back a registration application result to the STA side. After the STA side successfully applies to the AP side for registration, the following frequency-domain information reporting procedure is performed. To be specific, the STA side may report STA-side frequency-domain interference information to the AP side, where the STA-side frequency-domain interference information indicates a STA-side interference frequency band, so that the AP side avoids the STA-side interference frequency band based on the STA-side frequency-domain interference information, and schedules an uplink frequency-domain resource on the STA side.

[Frequency-Domain Information Reporting Procedure]

In a Wi-Fi 6 communications standard, OFDMA is used for data transmission. In this embodiment of this application, the STA device may actively report STA-side frequency-domain subband information, where the frequency-domain subband information indicates a frequency-domain interference subband, and therefore the frequency-domain subband information is also referred to as frequency-domain interference information. Then, the AP device avoids the interference frequency band in frequency domain of the STA-side subband when allocating an uplink time-frequency resource to the STA device. Because interference frequency bands in frequency domain of different tones are different, the AP device may select an optimal RU resource based on the STA-side frequency-domain interference information, and allocate the optimal RU resource to the STA device for data transmission.

That the AP device selects an optimal RU resource may be understood as the following: The AP device may exclude the interference frequency band in frequency domain of the STA-side subband based on the STA-side frequency-domain interference information, to determine a frequency-domain channel granularity for data transmission or a combination of various channel granularities, to be used as an uplink frequency-domain resource of the STA device.

The channel granularity refers to a size of a tone block, that is, a quantity of tones included in the tone block. For example, it is stipulated in the 802.11 protocol that a minimum channel granularity is an RU including 26 tones, that is, a 26-tone RU. As described above, the channel granularity may be a 26-tone RU, a 52-tone RU, a 106-tone RU, a 242-tone RU, a 484-tone RU, a 996-tone RU, or a 2×996-tone RU, or any combination of these channel granularities.

Table 3 shows an example of a correspondence between an RU allocation subfield and a channel granularity allocation result. A corresponding channel granularity allocation result may be determined based on a value of the RU allocation subfield. Descriptions are provided below with reference to Table 3.

TABLE 3

| RU allocation subfield (B7-B0) | #1 | #2 | #3 | #4 | #5 | #6 | #7 | #8 | #9 |
|---|---|---|---|---|---|---|---|---|---|
| 0 (00000000) | 26 | 26 | 26 | 26 | 26 | 26 | 26 | 26 | 26 |
| 1 (00000001) | 26 | 26 | 26 | 26 | 26 | 26 | 26 | 52 | |
| 2 (00000010) | 26 | 26 | 26 | 26 | 26 | 52 | | 26 | 26 |
| 3 (00000011) | 26 | 26 | 26 | 26 | 26 | 52 | | 52 | |
| 4 (00000100) | 26 | 26 | 52 | | 26 | 26 | 26 | 26 | 26 |
| 5 (00000101) | 26 | 26 | 52 | | 26 | 26 | 26 | 52 | |
| 6 (00000110) | 26 | 26 | 52 | | 26 | 52 | | 26 | 26 |
| 7 (00000111) | 26 | 26 | 52 | | 26 | 52 | | 52 | |
| 8 (00001000) | 52 | | 26 | 26 | 26 | 26 | 26 | 26 | 26 |
| 9 (00001001) | 52 | | 26 | 26 | 26 | 26 | 26 | 52 | |
| 10 (00001010) | 52 | | 26 | 26 | 26 | 52 | | 26 | 26 |
| 11 (00001011) | 52 | | 26 | 26 | 26 | 52 | | 52 | |
| 12 (00001100) | 52 | | 52 | | 26 | 26 | 26 | 26 | 26 |
| 13 (00001101) | 52 | | 52 | | 26 | 26 | 26 | 52 | |
| 14 (00001110) | 52 | | 52 | | 26 | 52 | | 26 | 26 |
| 15 (00001111) | 52 | | 52 | | 26 | 52 | | 52 | |

For example, when the RU allocation subfield (B7 B6 B5 B4 B3 B2 B1 B0) is 0 (00000000), the corresponding channel granularity allocation result may be nine 26-tone RUs.

For example, when the RU allocation subfield (B7 B6 B5 B4 B3 B2 B1 B0) is 1 (00000001), the corresponding channel granularity allocation result may be seven 26-tone RUs and one 52-tone RU.

For example, when the RU allocation subfield (B7 B6 B5 B4 B3 B2 B1 B0) is 2 (00000010) the corresponding channel granularity allocation result may be seven 26-tone RUs and one 52-tone RU.

For example, when the RU allocation subfield (B7 B6 B5 B4 B3 B2 B1 B0) is 3 (00000011), the corresponding channel granularity allocation result may be five 26-tone RUs and two 52-tone RUs.

For example, when the RU allocation subfield (B7 B6 B5 B4 B3 B2 B1 B0) is 4 (00000100), the corresponding channel granularity allocation result may be seven 26-tone RUs and one 52-tone RU.

For example, when the RU allocation subfield (B7 B6 B5 B4 B3 B2 B1 B0) is 5 (00000101), the corresponding channel granularity allocation result may be five 26-tone RUs and two 52-tone RUs.

For example, when the RU allocation subfield (B7 B6 B5 B4 B3 B2 B1 B0) is 6 (00000110), the corresponding channel granularity allocation result may be five 26-tone RUs and two 52-tone RUs.

For example, when the RU allocation subfield (B7 B6 B5 B4 B3 B2 B1 B0) is 7 (00000111), the corresponding channel granularity allocation result may be three 26-tone RUs and three 52-tone RUs.

For example, when the RU allocation subfield (B7 B6 B5 B4 B3 B2 B1 B0) is 8 (00001000), the corresponding channel granularity allocation result may be seven 26-tone RUs and one 52-tone RU.

For example, when the RU allocation subfield (B7 B6 B5 B4 B3 B2 B1 B0) is 9 (00001001), the corresponding channel granularity allocation result may be five 26-tone RUs and two 52-tone RUs.

For example, when the RU allocation subfield (B7 B6 B5 B4 B3 B2 B1 B0) is 10 (00001010), the corresponding channel granularity allocation result may be five 26-tone RUs and two 52-tone RUs.

For example, when the RU allocation subfield (B7 B6 B5 B4 B3 B2 B1 B0) is 11 (00001011), the corresponding channel granularity allocation result may be three 26-tone RUs and three 52-tone RUs.

For example, when the RU allocation subfield (B7 B6 B5 B4 B3 B2 B1 B0) is 12 (00001100), the corresponding channel granularity allocation result may be five 26-tone RUs and two 52-tone RUs.

For example, when the RU allocation subfield (B7 B6 B5 B4 B3 B2 B1 B0) is 13 (00001101), the corresponding channel granularity allocation result may be three 26-tone RUs and three 52-tone RUs.

For example, when the RU allocation subfield (B7 B6 B5 B4 B3 B2 B1 B0) is 14 (00001110), the corresponding channel granularity allocation result may be three 26-tone RUs and three 52-tone RUs.

For example, when the RU allocation subfield (B7 B6 B5 B4 B3 B2 B1 B0) is 15 (00001111), the corresponding channel granularity allocation result may be one 26-tone RU and four 52-tone RUs.

It should be noted that the channel granularity allocation results corresponding to the RU allocation subfields all are different, that is, allocation of uplink frequency-domain resources is different, so that subband interference can be avoided.

It should be further noted that Table 3 shows examples of RU channel granularity allocation. In actual implementation, this embodiment of this application includes but is not limited to the foregoing cases, and may further include other RU channel granularity allocation solutions, which may be specifically determined based on an actual use requirement and is not limited in this embodiment of this application.

In this embodiment of this application, the STA device actively reports the STA-side frequency-domain interference information to the AP device, so that the AP device avoids the interference frequency band in frequency domain of the STA-side subband when allocating an uplink time-frequency resource to the STA device, that is, the AP device may allocate a proper uplink frequency-domain resource (that is, an RU resource) to the STA side based on the STA-side frequency-domain interference information for data transmission. In the solution of this application, in a scenario with a large OFDMA bandwidth, anti-interference performance can be significantly improved.

An example of the frequency-domain information reporting procedure provided in this embodiment of this application is described below with reference to the following information exchanged between the STA side and the AP device through an air interface.

First, code is used below to list an example of interference frequency band reporting information carried in the management frame.

Frame Control.type value: 00: frame control.subtype: 1111; (management frame; reserved field)

Frame Body.dataByte[0-1]: 0x0002 (used to indicate feature enumeration and represent a frequency-domain indication feature, which is the same as that in the bcn)

Frame Body.dataByte[2-3]: 0x0003 (msg type frequency-domain interference information reporting)

Frame Body.dataByte[4]: 0x00 (reporting type, where 0 represents periodic reporting, and 1 represents aperiodic report)

Frame Body.dataByte[5]: 0x00 (reserved field)

Frame Body.dataByte[6]: 0x00 (reporting granularity, where 0 represents 26 tons, 1 represents 52 tons, 2 represents 104 tons, 3 represents 242 tons, and 4 represents 484 tons)

Frame Body.dataByte[7]: 0x00 (a quantity of valid reported bits: 0-1 bit, . . . , and 71-72 bits)

Frame Body.dataByte[9, 10, 11, 12]: 0x00000000 (the first word)

Frame Body.dataByte[13, 14, 15, 16]: 0x00000000 (the second word)

Frame Body.dataByte[17, 18, 19, 20]: 0x00000000 (the third word)

It may be learned from the foregoing information exchanged through an air interface by using the management frame that, the STA device sends the MAC packet to the AP device, where the MAC packet is the management frame, the frame body of the MAC packet carries the frequency-domain interference information, the reporting type (periodic reporting or aperiodic report), the reporting granularity, and the quantity of valid reported bits (bit), and the reserved field of the MAC packet indicates that the frame body carries the frequency-domain interference information, the reporting type, the reporting granularity, and the quantity of valid reported bits (bit).

For example, when a data byte 161 in the frame body (Frame Body) is 0, the corresponding reporting granularity is a 26-tone RU, that is, 26 tons.

For example, when the data byte [6] in the frame body (Frame Body) is 1, the corresponding reporting granularity is a 52-tone RU, that is, 52 tons.

For example, when the data byte [6] in the frame body (Frame Body) is 2, the corresponding reporting granularity is a 104-tone RU, that is, 104 tons.

For example, when the data byte [6] in the frame body (Frame Body) is 3, the corresponding reporting granularity is a 242-tone RU, that is, 242 tons.

For example, when the data byte [6] in the frame body (Frame Body) is 4, the corresponding reporting granularity is a 484-tone RU, that is, 484 tons.

It should be noted that, using the reporting granularity of 26 tons as an example, the quantity of valid reported bits is 9 in a case of 20 M, and a maximum quantity of valid reported bits is 72 in a case of 160 M.

Then, code is used below to list an example of reporting result feedback information (reporting succeeds or reporting fails) carried in the management frame.

Frame Control.type value: 00; frame control.subtype: 1111: (management frame; reserved field)

Frame Body.dataByte[0-1]: 0x0002 (used to indicate feature enumeration and represent a frequency-domain indication feature, which is the same as that in the bcn)

Frame Body.dataByte[2-3]: 0x0004 (msg type frequency-domain interference information reporting feedback)

Frame Body.dataByte[4]; 0x00 (reporting result, where 0 indicates that reporting succeeds, and 1 represents that reporting fails)

Frame Body.dataByte[5]: 0x00 (reserved field)

It may be learned from the foregoing information exchanged through an air interface by using the management frame that, the AP device sends the MAC packet to the STA device, where the MAC packet is the management frame, and the frame body of the MAC packet carries the frequency-domain interference information reporting feedback information, to notify the STA device whether frequency-domain interference information reporting succeeds. The reserved field of the MAC packet indicates that the frame body carries the frequency-domain interference information reporting feedback information. In other words, the AP side feeds back, to the STA side, whether frequency-domain interference information reporting succeeds.

In addition, code is used below to list an example of a frequency-domain interference information query request carried in the management frame.

Frame Control.type value: 00; frame control.subtype: 1111; (management frame; reserved field)

Frame Body.dataByte[0-1]: 0x0002 (used to indicate feature enumeration and represent a frequency-domain indication feature, which is the same as that in the bcn)

Frame Body.dataByte[2-3]: 0x0005 (msg type frequency-domain interference information query request)

Frame Body.dataByte[4]: 0x00 (reserved field)

Frame Body.dataByte[5]: 0x00 (reserved field)

It may be learned from the foregoing information exchanged through an air interface by using the management frame that, the AP device sends the MAC packet to the STA device, where the MAC packet is the management frame, the frame body of the MAC packet carries the frequency-domain interference information query request, and the reserved field of the MAC packet indicates that the frame body carries the frequency-domain interference information query request. In other words, the AP side sends the frequency-domain interference information query request to the STA side to request the STA side to perform frequency domain measurement.

In this embodiment of this application, the following policy is added: The STA side reports the frequency-domain interference information to the AP side, where the frequency-domain interference information indicates a frequency-domain interference subband, so that the AP side avoids the frequency-domain interference subband when scheduling an uplink frequency-domain resource on the STA side, and the STA side can support data transmission of a larger bandwidth, thereby improving a gain of an entire Wi-Fi cell.

It should also be noted that in the embodiments of this application, "greater than" may be replaced by "greater than or equal to", and "less than or equal to" may be replaced by "less than": or "greater than or equal to" may be replaced by "greater than", and "less than" may be replaced by "less than or equal to".

The embodiments described herein may be independent solutions or may be combined based on internal logic, and all these solutions fall within the protection scope of this application.

It may be understood that the methods and operations implemented by the terminal device in the method embodiments may be implemented by a component (for example, a chip or a circuit) available to the terminal device.

The method embodiments provided in this application are described above, and apparatus embodiments provided in this application are described below. It should be understood that the description of the apparatus embodiment and the description of the method embodiment correspond to each other. Therefore, for content not described in detail, refer to the method embodiment. For brevity, details are not described herein again.

The solutions provided in the embodiments of this application are described above from a perspective of a method step. It may be understood that, to implement the foregoing functions, the terminal device implementing the method includes a corresponding hardware structure and/or software module performing the functions. A person skilled in the art may be aware that the units and the algorithm steps in the examples described with reference to the embodiments disclosed herein can be implemented in this application by hardware or a combination of hardware and computer software. Whether a function is performed by hardware or computer software driving hardware depends on a specific application and a design constraint condition of the technical solutions. A person skilled in the art may use different methods for specific applications to implement the described functions, but this implementation should not be considered as beyond the protection scope of this application.

In the embodiments of this application, the terminal device may be divided into functional modules based on the foregoing method examples. For example, each functional module corresponding to each function may be obtained through division, or two or more functions may be integrated into one processing module. The integrated module may be implemented in a form of hardware or may be implemented in a form of a software functional module. It should be noted that module division in the embodiments of this application is an example, and is merely logical function division. In actual implementation, there may be another feasible division manner. An example in which each functional module corresponding to each function is obtained through division is used below for description.

Figure 11:
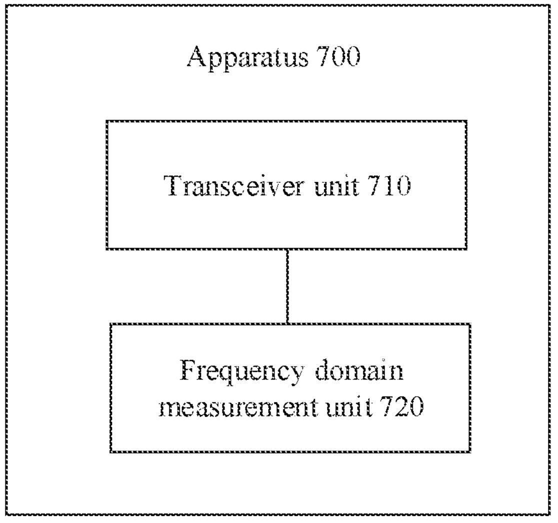
FIG. 11 is a schematic diagram of a structure of an apparatus for scheduling a frequency-domain resource in OFDMA according to an embodiment of this application.

FIG. 11 is a schematic block diagram of an apparatus 700 for scheduling a frequency-domain resource in OFDMA according to an embodiment of this application. The apparatus 700 may be configured to perform an action performed by a station STA in the foregoing method embodiment. The apparatus 700 supports a wireless network Wi-Fi 6 communications protocol, and the apparatus 700 accesses a first access point AP in an OFDMA manner. As shown in FIG. 11, the apparatus 700 includes a transceiver unit 710.

The transceiver unit 710 is configured to report first frequency-domain interference information to the first AP, where the first frequency-domain interference information is used to indicate that a first frequency-domain subband is an interference subband. The first frequency-domain interference information is used by the first AP to schedule an uplink frequency-domain resource of the apparatus 700, so that an uplink frequency-domain resource allocated to the apparatus 700 does not include the first frequency-domain subband.

In a Wi-Fi 6 OFDMA mode, because a bandwidth allocated to a user may be interfered with, a STA-side solution is proposed in this application: A STA device reports STA-side frequency-domain interference information to an AP device, where the frequency-domain interference information indicates a STA-side frequency-domain interference subband, so that the AP device can avoid, based on the STA-side frequency-domain interference information, the frequency-domain interference subband when allocating an uplink frequency-domain resource to the STA device, select a proper RU resource, and allocate the proper RU resource to the STA device for data transmission. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation, the transceiver unit 710 is specifically configured to: send a first media access control MAC packet to the first AP, where a payload of the first MAC packet carries the first frequency-domain interference information, and a reserved field in a frame control field of the first MAC packet indicates that the first MAC packet carries the first frequency-domain interference information.

In the solution of this application, the STA device adds the frequency-domain interference information to a frame body of the MAC packet, defines, in the reserved field of the MAC packet, functions of a management frame and a control frame, that is, transmitting frequency band interference information, and reports the frequency band interference information to the AP side, which effectively ensures that the STA device and the AP device cooperate in exchange of the frequency band interference information, thereby improving reliability of data transmission.

In a possible implementation, the frame control field of the first MAC packet includes a frame type value and a frame subtype value, the frame type value is used to indicate a management frame or a control frame, and the reserved field is a private field indicated by the frame subtype value. When a frame type is the management frame or the control frame, the reserved field indicates that the first MAC packet carries the first frequency-domain interference information.

In the solution of this application, the reserved field of the MAC packet is used to define the functions of the management frame and the control frame, that is, transmitting the frequency band interference information, which may effectively ensure that the STA device and the AP device cooperate in exchange of the frequency band interference information, thereby improving reliability of data transmission.

In a possible implementation, the transceiver unit 710 is further configured to: report, to the first AP, first channel granularity information corresponding to the apparatus 700, where the first channel granularity information is added to an RU allocation subfield in the frame control field of the packet sent to the first AP.

The first channel granularity information is used to indicate that the apparatus 700 uses a first resource unit RU channel granularity, and the RU represents one or more tones in frequency domain.

In the solution of this application, the STA device reports channel granularity information to the AP device, so that the AP device can select a proper RU resource based on the channel granularity information, and allocate the proper RU resource to the STA device for data transmission, to improve throughput in data transmission on a large OFDMA bandwidth.

In a possible implementation, the first RU channel granularity includes a 26-tone RU, a 52-tone RU, a 106-tone RU, a 242-tone RU, a 484-tone RU, a 996-tone RU, or a 2×996-tone RU, or any combination of the channel granularities.

In the solution of this application, an RU channel granularity may have a plurality of possibilities, so that an RU resource allocated by the AP device to the STA device may be more refined, to improve throughput in data transmission on a large OFDMA bandwidth.

In a possible implementation, the transceiver unit 710 is further configured to periodically report the first frequency-domain interference information to the first AP.

In a possible implementation, as shown in FIG. 11, the apparatus 700 further includes a frequency domain measurement unit 720.

The transceiver unit 710 is further configured to receive a first query request sent by the first AP, where the first query request is used to request the apparatus 700 to report the first frequency-domain interference information.

The frequency domain measurement unit 720 is configured to perform frequency domain measurement in response to the first query request to obtain the first frequency-domain interference information.

The transceiver unit 710 is further configured to report the first frequency-domain interference information to the first AP.

In the foregoing solution, the STA device may periodically report the frequency-domain interference information to the AP device, or may report the frequency-domain interference information in response to a request of the AP. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation, the transceiver unit 710 is further configured to send a first registration request to the first AP, where the first registration request is used to apply to the first AP for registration of a frequency-domain interference information reporting feature.

When registration application succeeds, the first AP supports in receiving the first frequency-domain interference information sent by the transceiver unit 710, and schedules a frequency-domain resource on the apparatus 700 side based on the first frequency-domain interference information.

In the foregoing solution, the STA device and the AP device negotiate on a capability, and after registration application succeeds, the AP device and the STA device complete negotiation on the frequency-domain interference information reporting feature. In this way, frequency-domain interference information reporting can be further supported.

In a possible implementation, the transceiver unit 710 is specifically configured to:

receive a first feature message advertised by the first AP, where the first feature message indicates that the first AP supports the frequency-domain interference information reporting feature; and send the first registration request to the first AP.

In the foregoing solution, when the STA device determines that the AP device supports the frequency-domain interference information reporting feature, the STA device determines, based on a situation, whether it is necessary to apply to the AP device for registration of the frequency-domain interference information reporting feature, to improve efficiency of capability negotiation.

In a possible implementation, the transceiver unit 710 is specifically configured to send the first registration request to the first AP after the apparatus 700 completes a scanning and discovery procedure, an authentication procedure, and an association procedure with the first AP.

In the foregoing solution, after accessing the AP device, the STA device may apply to the AP device for registration of the frequency-domain interference information reporting feature, to improve communication security.

In a possible implementation, the transceiver unit 710 is further configured to: report a reporting type of the frequency-domain interference information to the first AP, where the reporting type is periodic reporting or aperiodic reporting: and/or report a quantity of valid reported bits of the frequency-domain interference information to the first AP.

In the foregoing solution, the STA device actively sends an identifier of the STA device, which helps the AP device scan and discover the STA device, to improve efficiency of communication between the two ends.

The apparatus 700 in the embodiments of this application may correspondingly perform the method described in the embodiments of this application. In addition, the foregoing and other operations and/or functions of the units in the apparatus 700 are separately configured to implement corresponding procedures of the method. For brevity, details are not described herein again.

Figure 12:
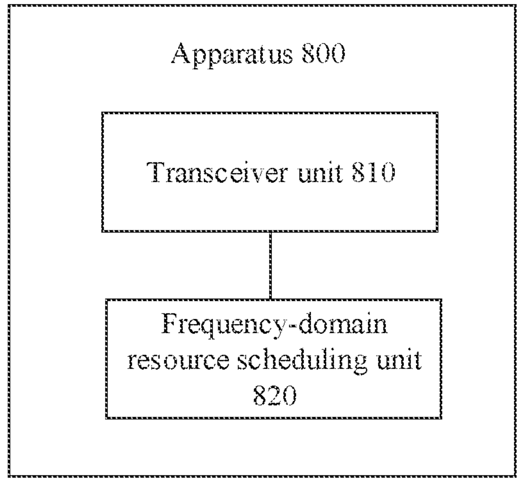
FIG. 12 is a schematic diagram of a structure of another apparatus for scheduling a frequency-domain resource in OFDMA according to an embodiment of this application.

FIG. 12 is a schematic block diagram of an apparatus 800 for scheduling a frequency-domain resource in OFDMA according to an embodiment of this application. The apparatus 800 may be configured to perform an action performed by an access point AP in the foregoing method embodiment. The apparatus 800 supports a wireless network Wi-Fi 6 communications protocol, and a plurality of stations STAs access the apparatus 800 in an OFDMA manner. As shown in FIG. 12, the apparatus 800 includes a transceiver unit 810 and a frequency-domain resource scheduling unit 820.

The transceiver unit 810 is configured to receive first frequency-domain interference information reported by a first STA, where the first frequency-domain interference information is used to indicate that a first frequency-domain subband is an interference subband, and the first STA is one of the plurality of STAs.

The frequency-domain resource scheduling unit 820 is configured to schedule an uplink frequency-domain resource of the first STA based on the first frequency-domain interference information, so that an uplink frequency-domain resource allocated to the first STA does not include the first frequency-domain subband.

In a Wi-Fi 6 OFDMA mode, because a bandwidth allocated to a user may be interfered with, an AP-side solution is proposed in this application: In the method for scheduling a frequency-domain resource in OFDMA provided in this application, an AP device receives STA-side frequency-domain interference information reported by a STA device, where the frequency-domain interference information indicates a STA-side frequency-domain interference subband, so that the AP device avoids, based on the STA-side frequency-domain interference information, the frequency-domain interference subband when allocating an uplink frequency-domain resource to the STA device, selects a proper RU resource, and allocates the proper RU resource to the STA device for data transmission. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation, the transceiver unit 810 is further configured to receive first channel granularity information sent by the first STA, where the first channel granularity information is used to indicate that the first STA uses a first resource unit RU channel granularity, and the RU represents one or more tones in frequency domain.

The frequency-domain resource scheduling unit 820 is further configured to allocate an uplink frequency-domain resource to the first STA based on the first RU channel granularity.

In the solution of this application, the AP device may select a proper RU resource based on channel granularity information reported by the STA device, and allocate the proper RU resource to the STA device for data transmission, to improve throughput in data transmission on a large OFDMA bandwidth.

In a possible implementation, the first RU channel granularity includes a 26-tone RU, a 52-tone RU, a 106-tone RU, a 242-tone RU, a 484-tone RU, a 996-tone RU, or a 2-996-tone RU, or any combination of the channel granularities.

In the solution of this application, an RU channel granularity may have a plurality of possibilities, so that an RU resource allocated by the AP device to the STA device may be more refined, to improve throughput in data transmission on a large OFDMA bandwidth.

In a possible implementation, the transceiver unit 810 is further configured to send a first query request to the first STA, where the first query request is used to request the first STA to report the first frequency-domain interference information.

In the solution of this application, the AP device requests to report the frequency-domain interference information, so that the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation, the transceiver unit 810 is further configured to send a first response message to the first STA when receiving the first frequency-domain interference information reported by the first STA, where the first response message is used to indicate that the apparatus 800 receives the first frequency-domain interference information reported by the first STA In the foregoing solution, the AP device feeds back a response after receiving the frequency-domain interference information reported by the STA device. In this way, the AP device cooperates and interacts with the STA device to schedule a frequency-domain resource in OFDMA, which may reduce impact of frequency-domain interference on Wi-Fi transmission, and improve throughput in data transmission on a large OFDMA bandwidth.

In a possible implementation, the transceiver unit 810 is further configured to receive a first registration request sent by the first STA, where the first registration request is used to apply to the apparatus 800) for registration of a frequency-domain interference information reporting feature.

The transceiver unit 810 is further configured to send a second response message to the first STA in response to the first registration request, where the second response message is used to indicate that registration application succeeds or registration application fails.

When registration application succeeds, the apparatus 800 supports in receiving the first frequency-domain interference information sent by the first STA, and schedules a frequency-domain resource of the first STA based on the first frequency-domain interference information.

In the foregoing solution, the STA device and the AP device negotiate on a capability, and after registration application succeeds, the AP device and the STA device complete negotiation on the frequency-domain interference information reporting feature. In this way, frequency-domain interference information reporting can be further supported.

In a possible implementation, the transceiver unit 810 is further configured to advertise a first feature message, where the first feature message is used to indicate that the apparatus 800 supports or does not support the frequency-domain interference information reporting feature.

In the foregoing solution, the AP device advertises whether the AP side supports the frequency-domain interference information reporting feature, so that the STA device determines, based on a situation, whether it is necessary to apply to the AP device for registration of the frequency-domain interference information reporting feature, to improve efficiency of capability negotiation.

In a possible implementation, the transceiver unit 810 is further configured to receive a first probe request message sent by the first STA, where the first probe request message includes a physical MAC address of the first STA.

The transceiver unit 810 is further configured to send a first probe response message to the first STA based on the MAC address of the first STA, where the first probe response message is used to indicate that the first STA is scanned and discovered by the apparatus 800.

In the foregoing solution, in addition to receiving the frequency-domain interference information and the channel granularity information that are reported by the STA device, the AP device further receives a reporting type and a quantity of valid reported bits, so that accuracy and reliability of obtaining the frequency-domain interference information by the AP device can be improved.

The apparatus 800 in the embodiments of this application may correspondingly perform the method described in the embodiments of this application. In addition, the foregoing and other operations and/or functions of the units in the apparatus 800 are separately configured to implement corresponding procedures of the method. For brevity, details are not described herein again.

Figure 13:
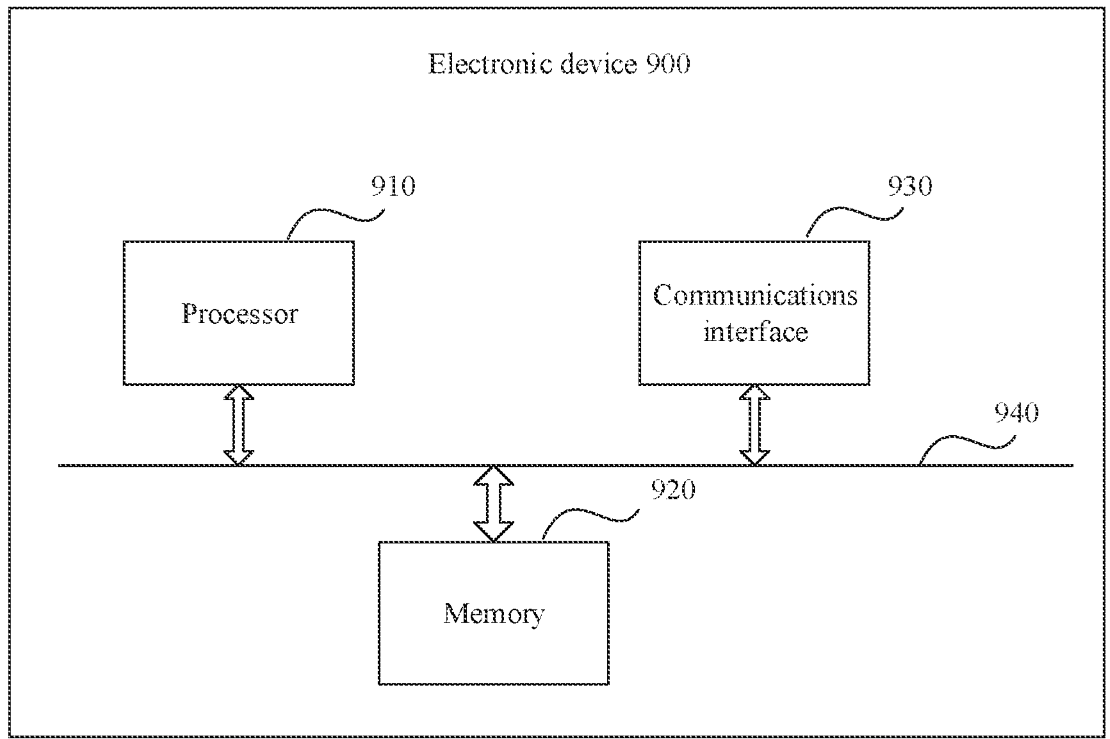
FIG. 13 is a schematic diagram of a structure of an electronic device according to an embodiment of this application.

FIG. 13 is a schematic diagram of a structure of an electronic device 900 according to an embodiment of this application. It should be understood that the Wi-Fi device 900 may correspond to the AP device or the STA device in the foregoing embodiments of this application. The electronic device 900 includes a processor 910, a memory 920, a communications interface 930, and a bus 940.

The processor 910 may be connected to the memory 920. The memory 920 may be configured to store program code and data. Therefore, the memory 920 may be an internal storage unit of the processor 910, may be an external storage unit independent of the processor 910, or may be a part including an internal storage unit of the processor 910 and an external storage unit independent of the processor 910. It should be noted that the processor 910 in the electronic device 900 shown in FIG. 13 may correspond to the frequency-domain resource scheduling unit 820 in the apparatus 800 in FIG. 12.

Optionally, the electronic device 900 may further include the bus 940. The memory 920 and the communications interface 930 may be connected to the processor 910 by using the bus 940. The bus 940 may be a peripheral component interconnect (peripheral component interconnect, PCI) bus, an extended industry standard architecture (extended industry standard architecture, EISA) bus, or the like. The bus 940 may be classified into an address bus, a data bus, a control bus, and the like. For ease of representation, only one line is used for representation in FIG. 13, but this does not indicate that there is only one bus or one type of bus.

It should be understood that in this embodiment of this application, the processor 910 may be a central processing unit (central processing unit, CPU). The processor may be another general-purpose processor, a digital signal processor (digital signal processor, DSP), an application specific integrated circuit (application specific integrated circuit, ASIC), a field programmable gate array (field programmable gate Array, FPGA) or another programmable logic device, a discrete gate or transistor logic device, a discrete hardware component, or the like. The general-purpose processor may be a microprocessor, or the processor may be any conventional processor or the like. Alternatively, the processor 910 may use one or more integrated circuits to execute a related program, to implement the technical solutions provided in the embodiments of this application.

The memory 920 may include a read-only memory and a random access memory, and provides instructions and data for the processor 910. A part of the processor 910 may further include a non-volatile random access memory. For example, the processor 910 may further store information about a device type.

When the electronic device 900 runs, the processor 910 executes computer execution instructions in the memory 920 to perform the operation steps in the foregoing methods.

In some embodiments, the electronic device 900 in this embodiment of this application may correspond to the apparatus 700 in the embodiments of this application, and the communications interface 930 in the electronic device 900 may correspond to the transceiver unit 710 in the apparatus 700.

In some embodiments, the electronic device 900 in this embodiment of this application may correspond to the apparatus 800 in the embodiments of this application, the processor 910 in the electronic device 900 may correspond to the frequency-domain resource scheduling unit 820 in the apparatus 800, and the communications interface 930 in the electronic device 900 may correspond to the transceiver unit 810 in the apparatus 800.

Optionally, in some embodiments, an embodiment of this application further provides a computer-readable medium. The computer-readable medium stores program code, and when the computer program code is run on a computer, the computer is enabled to perform the methods in the foregoing aspects.

Optionally, in some embodiments, an embodiment of this application further provides a chip, including a processor. The processor is configured to read and execute a computer program stored in a memory, to perform the methods in the foregoing aspects.

Optionally, in some embodiments, an embodiment of this application further provides a computer program product. The computer program product includes computer program code, and when the computer program code is run on a computer, the computer is enabled to perform the methods in the foregoing aspects.

In the embodiments of this application, the electronic device or the network device includes a hardware layer, an operating system layer that runs above the hardware layer, and an application layer that runs above the operating system layer. The hardware layer may include hardware such as a central processing unit (central processing unit, CPU), a memory management unit (memory management unit, MMU), and a memory (also referred to as a main memory). An operating system of the operating system layer may be any one or more computer operating systems that process a service by using a process (process), for example, a Linux operating system, a Unix operating system, an Android operating system, an iOS operating system, or a windows operating system. The application layer may include applications such as a browser, an address book, word processing software, and instant messaging software.

A specific structure of an entity for performing the method provided in the embodiments of this application is not specially limited in the embodiments of this application, provided that a program that records code of the method provided in the embodiments of this application can be run to perform communication based on the method provided in the embodiments of this application. For example, the method provided in the embodiments of this application may be performed by an electronic device or a network device, or a functional module that is in the electronic device or the network device and that can invoke a program and execute the program.

Aspects or features in this application may be implemented as methods, apparatuses, or products that use standard programming and/or engineering technologies. The term "product" used herein may cover a computer program accessible from any computer-readable device, carrier, or medium. For example, the computer-readable medium may include but is not limited to: a magnetic storage device (for example, a hard disk, a floppy disk, or a magnetic tape), an optical disc (for example, a compact disc (compact disc. CD) or a digital versatile disc (digital versatile disc, DVD)), a smart card, and a flash storage device (for example, an erasable programmable read-only memory (erasable programmable read-only memory, EPROM), a card, a stick, or a key drive).

Various storage media described herein may represent one or more devices and/or another machine-readable medium configured to store information. The term "machine-readable medium" may include but is not limited to a radio channel and various other media that can store, include, and/or carry instructions and/or data.

It should be understood that the processor mentioned in the embodiments of this application may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in the embodiments of this application may be a volatile memory or a non-volatile memory, or may include both the volatile memory and the non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, or another programmable logic device, a discrete gate or transistor logic component, or a discrete hardware component, the memory (storage module) may be integrated into the processor. It should be further noted that the memory described herein is intended to include but is not limited to these and any other suitable type of memory.

A person of ordinary skill in the art may be aware that the units and the steps in the examples described with reference to the embodiments disclosed herein can be implemented by electronic hardware or a combination of computer software and electronic hardware. Whether these functions are performed by hardware or software depends on a specific application and a design constraint condition of the technical solutions. A person skilled in the art may use different methods for specific applications to implement the described functions, but this implementation should not be considered as beyond the protection scope of this application.

It may be clearly understood by a person skilled in the art that, for convenience and brevity of description, for a specific working process of the foregoing described system, apparatus, and unit, refer to a corresponding process in the foregoing method embodiment. Details are not described herein again.

In the several embodiments provided in this application, it should be understood that the disclosed system, apparatus, and method can be implemented in other manners. For example, the described apparatus embodiment is merely an example. For example, the unit division is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be in an electronic, mechanical, or another form.

The units described as separate parts may or may not be physically separate, and parts displayed as units may or may not be physical units, may be located in one place, or may be distributed on a plurality of network units. Some or all of the units may be selected based on an actual requirement to implement the objectives of the solutions in the embodiments.

In addition, the functional units in the embodiments of this application may be integrated into one unit, or each of the units may exist separately physically, or two or more units may be integrated into one unit.

If the function is implemented in a form of a software functional unit and sold or used as an independent product, the function may be stored in a computer-readable storage medium. Based on such an understanding, the technical solutions of this application essentially or the part contributing to the prior art or some of the technical solutions may be implemented in a form of a computer software product. The computer software product is stored in a storage medium. The computer software product includes several instructions, and the instructions are used to enable a computer device (which may be a personal computer, a server, a network device, or the like) to perform all or some of the steps of the methods in the embodiments of this application. The storage medium may include but is not limited to various media that can store program code, such as a USB flash drive, a removable hard disk, a ROM, a RAM, a magnetic disk, or an optical disc.

Unless otherwise defined, all technical and scientific terms used herein have the same meanings as those commonly understood by a person skilled in the art belonging to this application. The terms used in the specification of this application are merely intended to describe specific embodiments and are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first station (STA) that supports a wireless network Wi-Fi 6 communications protocol and is configured to access a first access point (AP) in an orthogonal frequency-division multiple access (OFDMA) manner, the first STA comprising:

a processor; and a memory coupled to the processor, wherein the memory stores instructions that, when executed by the processor, cause the first STA to be configured to:

send a first registration request to the first AP to apply to the first AP for registration by the first STA to a frequency-domain interference information reporting feature of the first AP;

report first frequency-domain interference information to the first AP, wherein the first frequency-domain interference information indicates that a first frequency-domain subband is an interference subband, wherein the first frequency-domain interference information enables the first AP to schedule an uplink frequency-domain resource of the first STA, so that an uplink frequency-domain resource allocated to the first STA does not comprise the first frequency-domain subband.

2. The first STA of claim 1, wherein the first STA being configured to report the first frequency-domain interference information to the first AP comprises the first STA being configured to send a first media access control (MAC) packet to the first AP, wherein a payload of the first MAC packet carries the first frequency-domain interference information, and a reserved field in a frame control field of the MAC packet indicates that the first MAC packet carries the first frequency-domain interference information.

3. The first STA of claim 2, wherein the frame control field of the first MAC packet comprises a frame type value and a frame subtype value, the frame type value indicates a management frame or a control frame, and the reserved field is a private field indicated by the frame subtype value, and wherein when a frame type is the management frame or the control frame, the reserved field indicates that the first MAC packet carries the first frequency-domain interference information.

4. The first STA of claim 2, wherein the instructions, when executed by the processor, further cause the first STA to be configured to report, to the first AP, first channel granularity information corresponding to the first STA, wherein the first channel granularity information is added to a resource unit (RU) allocation subfield in the frame control field of the packet sent to the first AP, and wherein the first channel granularity information indicates that the first STA uses a first RU channel granularity, and the RU represents one or more tones in a frequency domain.

5. The first STA of claim 4, wherein the first RU channel granularity comprises a 26-tone RU, a 52-tone RU, a 106-tone RU, a 242-tone RU, a 484-tone RU, a 996-tone RU, a 2×996-tone RU, or a combination thereof.

6. The first STA of claim 1, wherein the instructions, when executed by the processor, further cause the first STA to be configured to periodically report the first frequency-domain interference information to the first AP.

7. The first STA of claim 1, wherein the instructions, when executed by the processor, further cause the first STA to be configured to:

receive a first query request from the first AP, wherein the first query request requests the first STA to report the first frequency-domain interference information;

perform frequency domain measurement in response to the first query request to obtain the first frequency-domain interference information; and report the first frequency-domain interference information to the first AP.

8. The first STA of claim 1, wherein when registration application succeeds, the first AP supports in receiving the first frequency-domain interference information from the first STA, and schedules a frequency-domain resource of the first STA based on the first frequency-domain interference information.

9. The first STA of claim 8, wherein the first STA being configured to send the first registration request to the first AP comprises the first STA being configured to:

receive a first feature message advertised by the first AP, wherein the first feature message indicates that the first AP supports the frequency-domain interference information reporting feature; and send the first registration request to the first AP.

10. The first STA of claim 8, wherein the first STA being configured to send the first registration request to the first AP comprises the first STA being configured to send the first registration request to the first AP after the first STA completes a scanning and discovery procedure, an authentication procedure, and an association procedure with the first AP.

11. The first STA of claim 1, wherein the instructions, when executed by the processor, further cause the first STA to be configured to:

report a reporting type of the frequency-domain interference information to the first AP, wherein the reporting type is periodic reporting or aperiodic reporting; and/or report a quantity of valid reported bits of the frequency-domain interference information to the first AP.

12. A first access point (AP) that supports a wireless network Wi-Fi 6 communications protocol, wherein a plurality of stations (STAs) are configured to access the first AP in an orthogonal frequency-division multiple access (OFDMA) manner, the first AP comprising:

a processor; and a memory coupled to the processor, wherein the memory stores instructions that, when executed by the processor, cause the first AP to be configured to:

receive a first registration request from the first STA, wherein the first registration request is an application by the first STA to the first AP for registration to a frequency-domain interference information reporting feature of the first AP;

subsequent to registration of the first STA with the first AP according to the first registration request, receive first frequency-domain interference information reported by a first STA, wherein the first frequency-domain interference information indicates that a first frequency-domain subband is an interference subband, and the first STA is one of the plurality of STAs; and schedule an uplink frequency-domain resource of the first STA based on the first frequency-domain interference information, so that an uplink frequency-domain resource allocated to the first STA does not comprise the first frequency-domain subband.

13. The first AP of claim 12, wherein the instructions, when executed by the processor, further cause the first AP to be configured to:

receive first channel granularity information from the first STA, wherein the first channel granularity information indicates that the first STA uses a first resource unit (RU) channel granularity, and the RU represents one or more tones in a frequency domain; and allocate an uplink frequency-domain resource to the first STA based on the first RU channel granularity.

14. The first AP of claim 13, wherein the first RU channel granularity comprises a 26-tone RU, a 52-tone RU, a 106-tone RU, a 242-tone RU, a 484-tone RU, a 996-tone RU, a 2×996-tone RU, or a combination thereof.

15. The first AP of claim 12, wherein the instructions, when executed by the processor, further cause the first AP to be configured to send a first query request to the first STA, wherein the first query request requests the first STA to report the first frequency-domain interference information.

16. The first AP of claim 12, wherein the instructions, when executed by the processor, further cause the first AP to be configured to send a first response message to the first STA when receiving the first frequency-domain interference information from the first STA, wherein the first response message indicates that the first AP has received the first frequency-domain interference information from the first STA.

17. The first AP of claim 12, wherein the instructions, when executed by the processor, further cause the first AP to be configured to:

send a second response message to the first STA in response to the first registration request, wherein the second response message indicates that registration application succeeds or registration application fails, wherein when registration application succeeds, the first AP supports in receiving the first frequency-domain interference information from the first STA, and schedules a frequency-domain resource of the first STA based on the first frequency-domain interference information.

18. The first AP of claim 12, wherein the instructions, when executed by the processor, further cause the first AP to be configured to: advertise a first feature message, that indicates that the first AP supports or does not support the frequency-domain interference information reporting feature.

19. The first AP of claim 12, wherein the instructions, when executed by the processor, further cause the first AP to be configured to:

receive a first probe request message from the first STA, wherein the first probe request message comprises a physical MAC address of the first STA; and send a first probe response message to the first STA based on the MAC address of the first STA, wherein the first probe response message indicates that the first STA is scanned and discovered by the first AP.

20. A method for scheduling a frequency-domain resource in orthogonal frequency-division multiple access (OFDMA), applied to a first station (STA) that supports a wireless network Wi-Fi 6 communications protocol and is configured to access a first access point (AP) in an OFDMA manner, the method comprising:

sending, by the first STA, a first registration request to the first AP to apply to the first AP for registration by the first STA to a frequency-domain interference information reporting feature of the first AP;

subsequent to registration of the first STA with the first AP according to the first registration request, reporting, by the first STA, first frequency-domain interference information to the first AP, wherein the first frequency-domain interference information indicates that a first frequency-domain subband is an interference subband, wherein the first frequency-domain interference information enables the first AP to schedule an uplink frequency-domain resource of the first STA, so that an uplink frequency-domain resource allocated to the first STA does not comprise the first frequency-domain subband.

* * * * *